(12) United States Patent
Turner et al.

(10) Patent No.: US 11,477,600 B1
(45) Date of Patent: Oct. 18, 2022

(54) SPATIAL AUDIO DATA EXCHANGE

(71) Applicant: QUALCOMM Incorporated, San Diego, CA (US)

(72) Inventors: Richard Turner, Belfast (GB); Laurent Wojcieszak, Belfast (GB); Benjamin Campbell, Bury St Edmunds (GB)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/332,826

(22) Filed: May 27, 2021

(51) Int. Cl.
| | |
|---|---|
| H04S 7/00 | (2006.01) |
| H04R 5/033 | (2006.01) |
| G10L 19/008 | (2013.01) |
| H04R 1/10 | (2006.01) |
| G01P 13/00 | (2006.01) |
| H04R 5/04 | (2006.01) |
| H04S 3/00 | (2006.01) |

(52) U.S. Cl.
CPC ............. *H04S 7/304* (2013.01); *G01P 13/00* (2013.01); *G10L 19/008* (2013.01); *H04R 1/1041* (2013.01); *H04R 1/1075* (2013.01); *H04R 5/033* (2013.01); *H04R 5/04* (2013.01); *H04S 3/008* (2013.01); *H04R 2420/07* (2013.01); *H04S 2400/01* (2013.01); *H04S 2420/11* (2013.01)

(58) Field of Classification Search
CPC ...... H04S 7/304; H04S 3/008; H04S 2400/01; H04S 2420/11; G01P 13/00; G10L 19/008; H04R 1/1041; H04R 1/1075; H04R 5/033; H04R 5/04; H04R 2420/07
USPC ........................................................ 381/303
See application file for complete search history.

(56) References Cited

U.S. PATENT DOCUMENTS 10,582,330 B2 * 3/2020 De Bruijn ............... H04S 7/308
2018/0167876 A1 6/2018 McFarthing

* cited by examiner

*Primary Examiner* — Paul Kim
(74) *Attorney, Agent, or Firm* — Moore IP

(57) ABSTRACT

A device includes one or more processors configured to execute instructions to obtain, at a first audio output device, first spatial audio data and a first reference time associated, and to cause the first reference time and data representing at least a portion of the first spatial audio data to be transmitted from the first audio output device. The instructions further cause the one or more processors to receive, at the first audio output device from a second audio output device, second spatial audio data and a second reference time. The instructions further cause the one or more processors to, based on the first reference time and the second reference time, time-align the first spatial audio data and the second spatial audio data to generate combined audio data representing a three-dimensional (3D) sound field and to generate audio output based on the combined audio data.

30 Claims, 15 Drawing Sheets

SPATIAL AUDIO DATA EXCHANGE

I. FIELD

The present disclosure is generally related to using data exchange to facilitate generation of audio output based on spatial audio data.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

The proliferation of such devices has facilitated changes in media consumption. For example, there has been an increase in personal electronic gaming, where a handheld or portable electronic game system is used by a single person to play an electronic game. As another example, there has been an increase in personal media consumption, where a handheld or portable media player outputs media (e.g., audio, video, augmented reality media, mixed reality media, extended reality media, virtual reality media, etc.) to a single person. Such personalized or individualized media consumption often involves relatively small, portable (e.g., battery-powered) devices for generating output. The processing resources available to such portable devices may be limited due to the size of the portable device, weight constraints, power constraints, or for other reasons. As a result, it can be challenging to provide a high quality user experience using these resource constrained devices.

III. SUMMARY

According to a particular aspect of the present disclosure, a device includes a memory configured to store instructions and one or more processors configured to execute the instructions to obtain, at a first audio output device of a personal audio apparatus, first spatial audio data and a first reference time associated with the first spatial audio data. The instructions further cause the one or more processors to cause the first reference time and data representing at least a portion of the first spatial audio data to be transmitted from the first audio output device. The instructions further cause the one or more processors to receive, at the first audio output device from a second audio output device of the personal audio apparatus, second spatial audio data and a second reference time associated with the second spatial audio data. The instructions further cause the one or more processors to, based on the first reference time and the second reference time, time-align the first spatial audio data and the second spatial audio data to generate combined audio data representing a three-dimensional (3D) sound field. The instructions further cause the one or more processors to generate audio output based on the combined audio data.

According to a particular aspect of the present disclosure, a method includes obtaining, at a first audio output device of a personal audio apparatus, first spatial audio data and a first reference time associated with the first spatial audio data. The method also includes causing the first reference time and data representing at least a portion of the first spatial audio data to be transmitted from the first audio output device. The method further includes receiving, at the first audio output device from a second audio output device of the personal audio apparatus, second spatial audio data and a second reference time associated with the second spatial audio data. The method also includes, based on the first reference time and the second reference time, time-aligning the first spatial audio data and the second spatial audio data to generate combined audio data representing a three-dimensional (3D) sound field. The method also includes generating audio output based on the combined audio data.

According to another implementation of the present disclosure, a non-transitory computer-readable medium stores instructions that, when executed by one or more processors, cause the one or more processors to obtain, at a first audio output device of a personal audio apparatus, first spatial audio data and a first reference time associated with the first spatial audio data. The instructions further cause the one or more processors to cause the first reference time and data representing at least a portion of the first spatial audio data to be transmitted from the first audio output device. The instructions also cause the one or more processors to receive, at the first audio output device from a second audio output device of the personal audio apparatus, second spatial audio data and a second reference time associated with the second spatial audio data. The instructions further cause the one or more processors to, based on the first reference time and the second reference time, time-align the first spatial audio data and the second spatial audio data to generate combined audio data representing a three-dimensional (3D) sound field. The instructions also cause the one or more processors to generate audio output based on the combined audio data.

According to another implementation of the present disclosure, an apparatus includes means for obtaining first spatial audio data and a first reference time associated with the first spatial audio data at a first audio output device of a personal audio apparatus. The apparatus also includes means for causing the first reference time and data representing at least a portion of the first spatial audio data to be transmitted from the first audio output device. The apparatus further includes means for receiving second spatial audio data and a second reference time associated with the second spatial audio data at the first audio output device from a second audio output device of the personal audio apparatus. The apparatus also includes means for time-aligning the first spatial audio data and the second spatial audio data based on the first reference time and the second reference time to generate combined audio data representing a three-dimensional (3D) sound field. The apparatus further includes means for generating audio output based on the combined audio data.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 14:
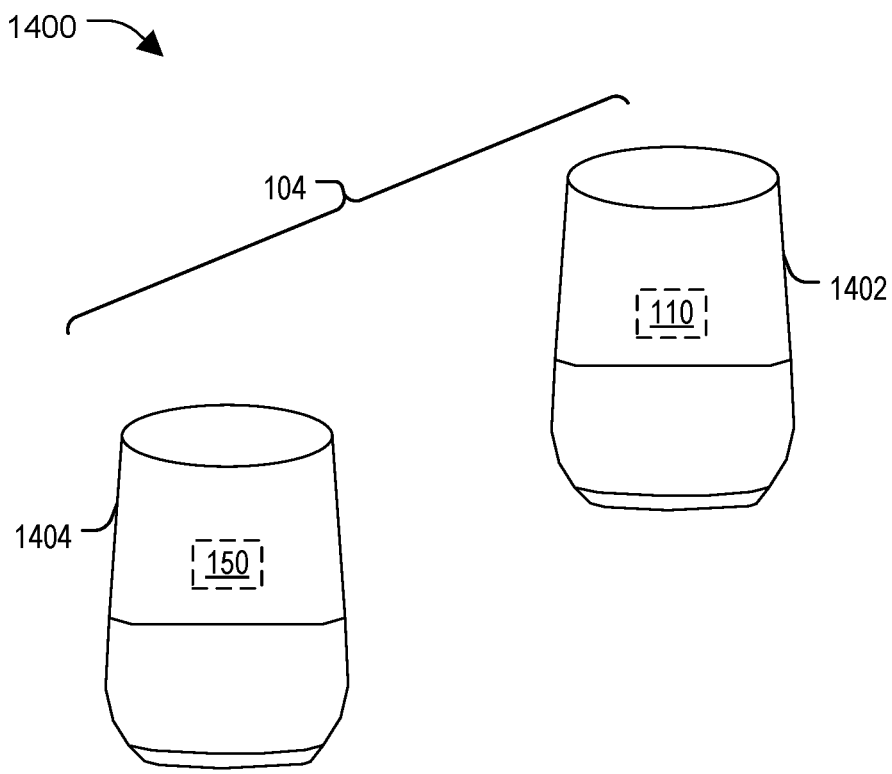

FIG. 14 a diagram of a speaker system operable to perform data exchange to enable generation of audio output from spatial audio data, in accordance with some examples of the present disclosure.

Figure 15:
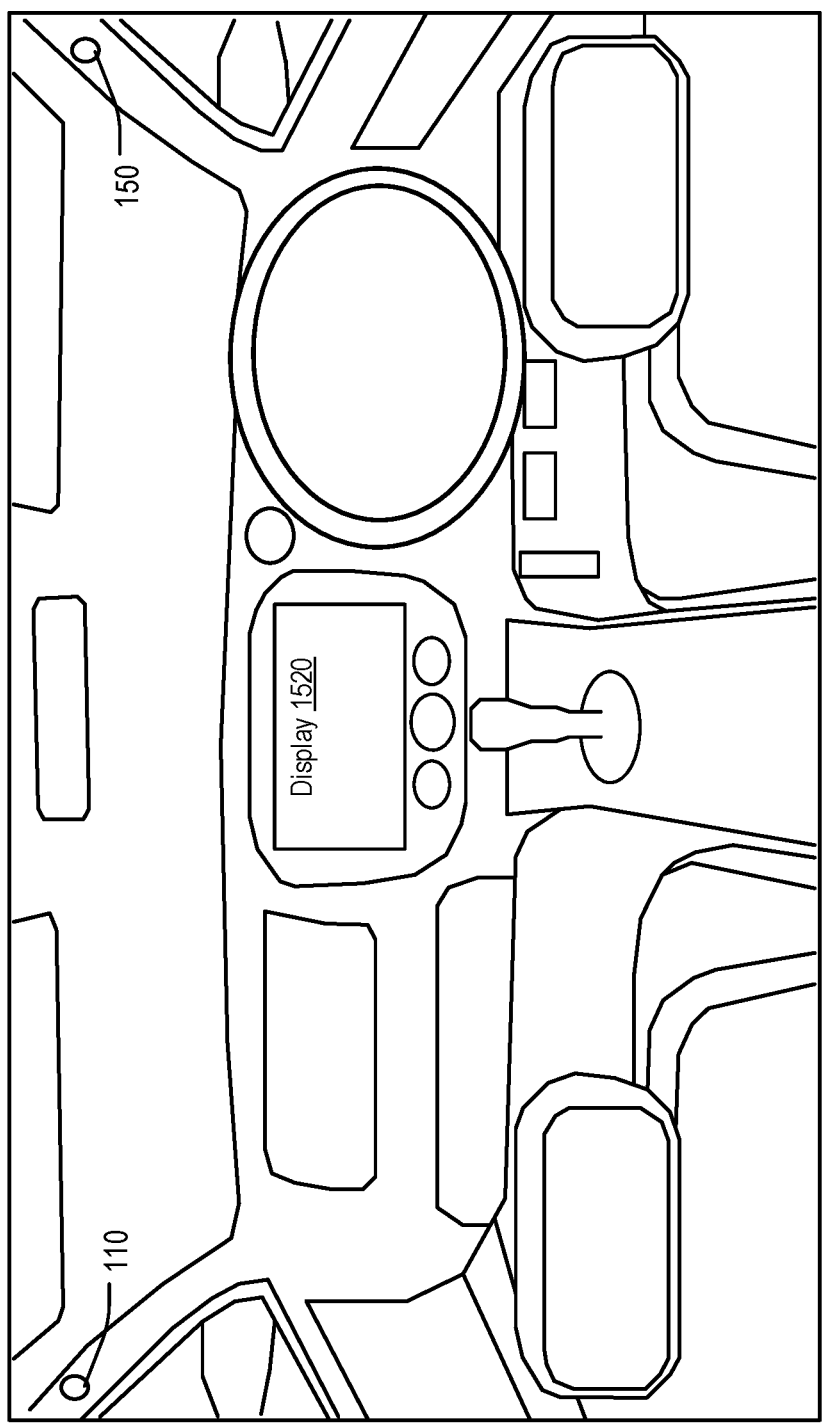

FIG. 15 is a diagram of an example of a vehicle including audio output devices operable to perform data exchange to enable generation of audio output from spatial audio data, in accordance with some examples of the present disclosure.

Figure 1:
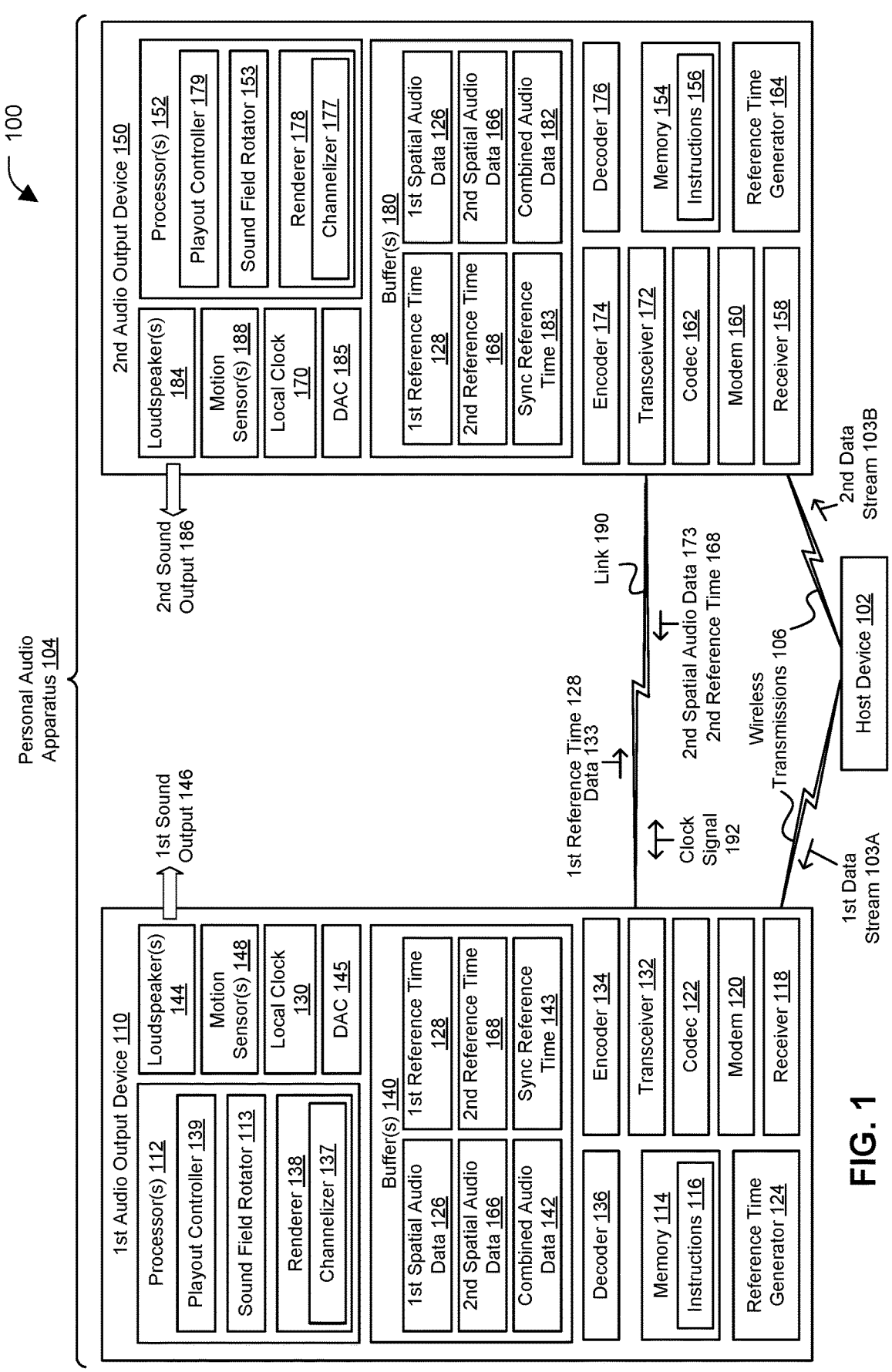
FIG. 1 is a block diagram of a particular illustrative aspect of a system that includes multiple audio output devices configured to exchange data to enable generation of audio output from spatial audio data, in accordance with some examples of the present disclosure.
Figure 16:
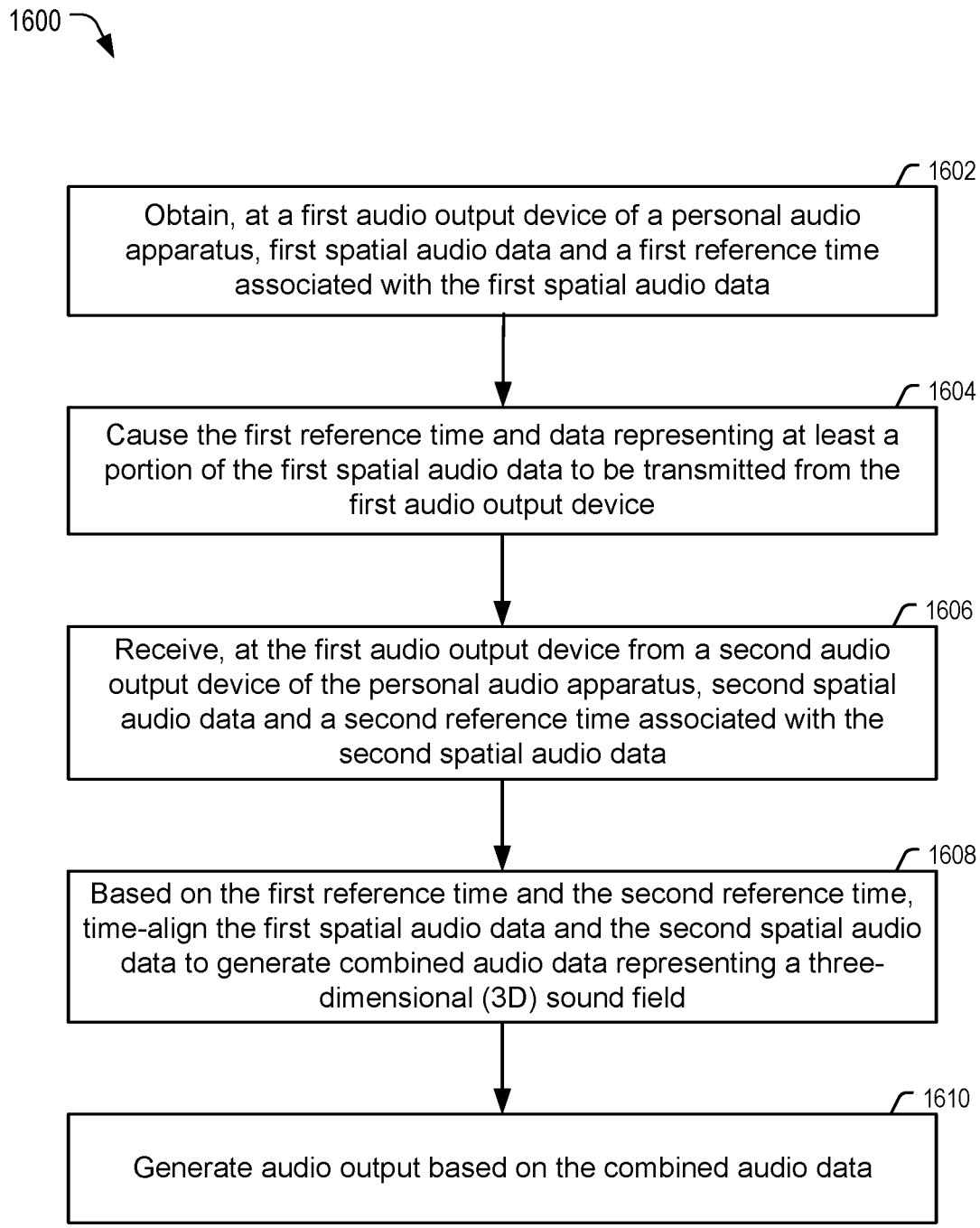

FIG. 16 is a diagram of a particular illustrative implementation of a method of generating audio output from spatial audio data performed by one or more of the audio output devices of FIG. 1, in accordance with some examples of the present disclosure.

Figure 17:
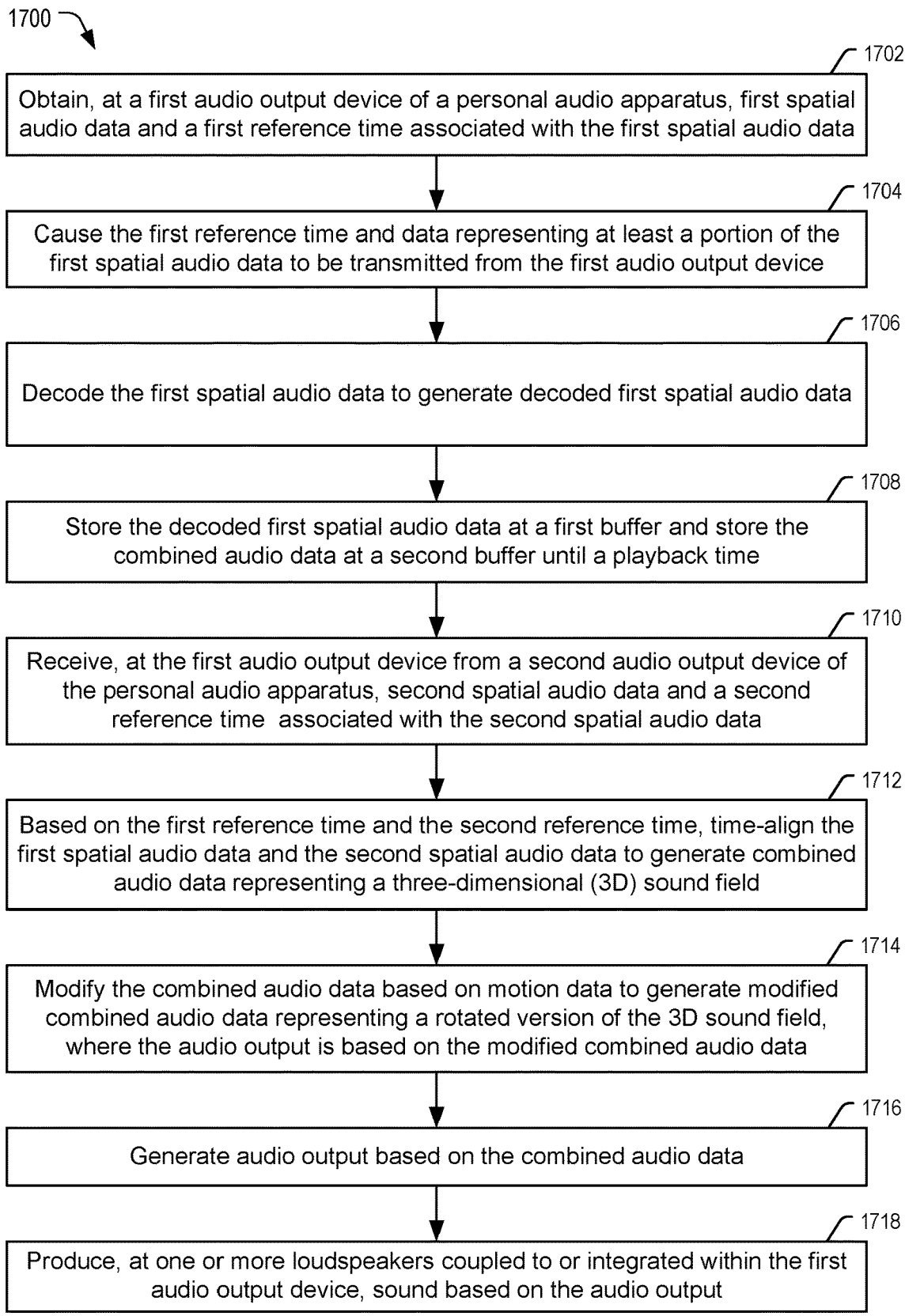

FIG. 17 is a diagram of a particular illustrative implementation of a method of generating audio output from spatial audio data performed by one or more of the audio output devices of FIG. 1, in accordance with some examples of the present disclosure.

V. DETAILED DESCRIPTION

Audio information can be captured or generated in a manner that enables rendering of audio output to represent a three-dimensional (3D) sound field. For example, ambisonics (e.g., first-order ambisonics (FOA) or higher-order ambisonics (HOA)) can be used to represent a 3D sound field for later playback. During playback, the 3D sound field can be reconstructed in a manner that enables a listener to distinguish the position and/or distance between the listener and one or more audio sources of the 3D sound field.

According to a particular aspect of the disclosure, a 3D sound field can be rendered using a personal audio apparatus, such as a headset, headphones, ear buds, or another audio playback device that is configured to generate two or more distinct audio output streams for a user. One challenge of rendering 3D audio using a personal audio apparatus is the computational complexity of such rendering. To illustrate, a personal audio apparatus is often configured to be worn by the user, such that motion of the user's head changes the relative positions of the user's ears and the audio source(s) in the 3D sound field to generate head-tracked immersive audio. Such personal audio apparatus are often battery powered and have limited on-board computing resources. Generating head-tracked immersive audio with such resource constraints is challenging. One way to sidestep certain power- and processing-constraints of personal audio apparatus is to perform much of the processing at a host device, such as a laptop computer or a mobile computing device. However, the more processing that is performed on the host device, the greater the latency between head motion and sound output, which leads to less satisfactory user experience.

Additionally, many personal audio apparatus include a pair of distinct audio output devices, such as a pair of ear buds that includes one ear bud for each ear. In such configurations, it is useful to balance power demands imposed on each audio output device so that one audio output device does not run out of power before the other. Since simulating a 3D sound field requires providing sound to both ears of a user, failure of one of the audio output devices (e.g., due to running out of battery power) would prematurely cease generation of 3D audio output.

Aspects disclosed herein facilitate reduction of computational complexity for rendering audio of a 3D sound field. Aspects disclosed herein also facilitate balancing resource demands between a pair of audio output devices to extend the duration of 3D sound field reproduction that can be provided by the audio output devices.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a first audio output device 110 including one or more processors ("processor(s)" 112 of FIG. 1), which indicates that in some implementations the first audio output device 110 includes a single processor 112 and in other implementations the first audio output device 110 includes multiple processors 112.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/ or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 shows a particular illustrative example of a system 100 that includes two or more audio output devices, such as a first audio output device 110 and a second audio output device 150, that are configured to perform data exchange to coordinate output of audio based on spatial audio data. In the particular implementation illustrated in FIG. 1, the spatial audio data is received from a host device 102 via one or more data streams, such as a first data stream 103A and a second data stream 103B. In a particular implementation, the first and second audio output devices 110, 150 are part of a personal audio apparatus 104 and are configured to cooperate to provide audio output, generally but not essentially, to a single user. Examples of personal audio apparatus 104 include headphones, earbuds, speakers positioned to provide a three-dimensional (3D) representation of sound to a user, or other devices that perform a similar function.

The spatial audio data represents sound from one or more sources (which may include real sources, virtual sources, or both) in three-dimensions such that audio output representing the spatial audio data can simulate or reproduce distance and direction between a listener and the one or more sources. The spatial audio data can be encoded using various encoding schemes, such as first order ambisonics (FOA), higher order ambisonics (HOA), or an equivalent spatial domain (ESD) representation. As an example, FOA coefficients or ESD data representing the spatial audio data can be encoded using four total channels, such as two stereo channels, and sent via wireless transmissions 106 as the first data stream 103A, the second data stream 103B, or both.

Each of the audio output devices 110, 150 is configured to generate acoustic output (e.g., sound) based on the spatial audio data. In a particular example, the first audio output device 110 is configured to generate first sound output 146 for a first ear of a user, and the second audio output device 150 is configured to generate second sound output 186 for a second ear of the user. In another particular example, the first sound output 146 corresponds to a first output channel of two or more output channels (e.g., surround sound channels), and the second sound output 186 corresponds to a second output channel of the two or more channels. The first sound output 146 and the second sound output 186 together simulate the spatial relationship of sound sources relative to the ears of the user such that the user perceives the monaural audio output as spatial audio.

As two examples, the spatial audio data can be represented via ambisonics coefficients or via an ESD representation. In an ESD representation, the spatial audio data includes four or more channels representing virtual loudspeakers disposed around a user. For example, an ESD representation of the spatial audio data may include four distinct audio channels corresponding to four virtual loudspeakers arranged about a listener at vertices of a tetrahedron. In this example, by controlling the timing (e.g., a phase relationship), amplitude, and frequency of sound associated with each channel, the ESD representation can simulate sound from any direction and from various distances around the listener. In a particular aspect, the ESD representation can be encoded (e.g., for transmission) using two stereo encoders. To illustrate, two channels of the ESD representation, corresponding to a first pair of the virtual loudspeakers, can be encoded together as a first differential stereo channel, and the two other channels of the ESD representation, corresponding to a second pair of the virtual loudspeakers, can be encoded together as a second differential stereo channel.

In FIG. 1, the first audio output device 110 includes one or more processors 112, a memory 114, a reference time generator 124, first communication components to facilitate communication with a host device 102, second communication components to facilitate communication with the second audio output device 150, and audio output components. The memory 114 stores instructions 116 that are executable by the processor(s) 112 to perform one or more of the functions or operations of the first audio output device 110. In the example illustrated in FIG. 1, the first communication components include a receiver 118, a modem 120, and a codec 122. Further, in the example illustrated in FIG. 1, the second communication components include a transceiver 132, an encoder 134, and a decoder 136. In this example, the audio output components include one or more loudspeakers 144, a digital to analog converter (DAC) 145, and a renderer 138, which includes or is coupled to one or more buffers 140.

The receiver 118, the modem 120, the codec 122, or a combination thereof, are coupled the processor(s) 112 and configured to provide data obtained from the host device 102 to the processor(s) 112 for further processing. For example, the receiver 118 may include circuits, hardware components, control components (e.g., firmware), etc. configured to support communication via a Bluetooth® (a registered trademark of BLUETOOTH SIG, INC., Washington) communication link, an Institute of Electrical and Electronic Engineers (IEEE) 802.11-type communication link (e.g., WiFi), another wireless peer-to-peer ad-hoc link, or any combination thereof. In the example illustrated in FIG. 1, the receiver 118 is configured to receive a data stream (e.g., the first data stream 103A) that includes at least first spatial audio data from the host device 102 via wireless transmissions 106. Although the first communication components in FIG. 1 do not show a transmitter, in some implementations, the first audio output device 110 also includes a transmitter configured to send data to the host device 102 via the wireless transmissions 106. For example, a wireless peer-to-peer ad-hoc link between the first audio output device 110 and the host device 102 may be bidirectional.

The modem 120 is configured to demodulate signals from the receiver 118 and provide the demodulated signals to the codec 122. The codec 122 is configured to decode, decompress, or otherwise reconstruct data encoded in the signals received from the modem 120. For example, the codec 122 may process the signals received from the modem 120 to generate decoded first spatial audio data 126, which is provided to the processor(s) 112 in the example of FIG. 1. Generating the decoded first spatial audio data 126 may include decompressing data to generate uncompressed data, decoding stereo data (e.g., a single differential data stream) to generate decoded stereo data (e.g., a pair of data streams), etc. The decoded first spatial audio data 126 includes at least a subset of the spatial audio data. To illustrate, if the spatial audio data is represented via ambisonics, the decoded first spatial audio data 126 may include at least two sets of ambisonics coefficients. As another illustration, if the spatial audio data is represented using an ESD representation, the decoded first spatial audio data 126 may correspond to at least two channels representing audio associated with at least two virtual loudspeakers. In some implementations, the decoded first spatial audio data 126 includes the entirety of the spatial audio data. To illustrate, if the spatial audio data is represented via first-order ambisonics, the decoded first spatial audio data 126 may include four sets of ambisonics coefficients corresponding to all ambisonics coefficients of the first-order ambisonics. As another illustration, if the spatial audio data is represented using the ESD representation, the decoded first spatial audio data 126 may include four channels representing audio associated with four virtual loudspeakers of the ESD representation.

The decoded first spatial audio data 126 includes or corresponds to pulse code modulation (PCM) data, ambisonics coefficients, channels of an ESD representation, or other data types, which are parsed into data frames. Each data frame of the decoded first spatial audio data 126 is associated with a respective first reference time 128. The first reference time 128 is indicative of a playout time associated with the corresponding data frame of the decoded first spatial audio data 126. For example, to reproduce an audio stream, the first audio output device 110 generates sound output (e.g., the first sound output 146) associated with a first data frame of the decoded first spatial audio data 126 followed by a second data frame of the decoded first spatial audio data 126, and so forth. The first reference time 128 indicates the playout order, the playout timing, or both, of each data frame of the data frames of the decoded first spatial audio data 126.

In a particular implementation, the first reference time 128 associated with a particular data frame of the decoded first spatial audio data 126 is determined by the reference time generator 124. For example, the reference time generator 124 may determine (e.g., based on a local clock 130) when the particular data frame was received and assign the first reference time 128 to the particular data frame based on an amount of time (e.g., a playback delay) that the first audio output device 110 uses to generate sound based on the particular data frame. The playback delay can be used to confirm receipt of data frames, to request replacement of missing or corrupt data frames, to reorder data frames received out of order, etc. For the system 100 of FIG. 1, the playback delay is also determined based on time required for exchange data 133 with the second audio output device 150 to enable the first audio output device 110 and the second audio output device 150 to synchronize generation of the first sound output 146 and the second sound output 186.

The transceiver 132, the encoder 134, the decoder 136, or a combination thereof, are coupled the processor(s) 112 and configured to facilitate data exchange with the second audio output device 150. For example, the transceiver 132 may include circuits, hardware components, control components (e.g., firmware), etc. configured to support communication via a Bluetooth® (a registered trademark of BLUETOOTH SIG, INC., Washington) communication link, an Institute of Electrical and Electronic Engineers (IEEE) 802.11-type communication link (e.g., WiFi), a near-field magnetic communication link (e.g., a Near Ultra-Low Energy Field communication link), another wireless peer-to-peer link, or any combination thereof. In the example illustrated in FIG. 1, the transceiver 132 is configured to send information to the second audio output device 150, receive information from the second audio output device 150, or both. For example, a link 190 between the first audio output device 110 and the second audio output device 150 may be unidirectional or bidirectional.

In various implementations, described further below, the information sent by the transceiver 132 to the second audio output device 150 can include, for example, a portion of the spatial audio data (as described further with reference to one or more of FIG. 2, FIG. 4, FIG. 5, FIG. 6, FIG. 7, FIG. 8, or FIG. 9), a clock signal 192 (as described further with reference to FIG. 3), motion data (as described further with reference to FIG. 8 or FIG. 9), and the first reference time 128. In various implementations, described further below, the information received by the transceiver 132 from the second audio output device 150 can include, for example, a portion of the spatial audio data, such as second spatial audio data 173 (as described further with reference to one or more of FIG. 2, FIG. 4, FIG. 5, FIG. 6, FIG. 7, FIG. 8, or FIG. 9), the clock signal 192 (as described further with reference to FIG. 3), motion data (as described further with reference to FIG. 9), and a second reference time 168.

In the example illustrated in FIG. 1, the encoder 134 is configured to encode the data 133 that is to be transmitted by the transceiver 132. To illustrate, the encoder 134 may encode at least a portion of the spatial audio data for transmission to the second audio output device 150. Further, in the example illustrated in FIG. 1, the decoder 136 is configured to decode data received by the transceiver 132 from the second audio output device 150. To illustrate, when the transceiver 132 receives the second spatial audio data 173 and the second reference time 168 from the second audio output device 150, the decoder 136 may decode at least the second spatial audio data 173 and store the decoded second spatial audio data 173 at a buffer of the buffer(s) 140.

In the example illustrated in FIG. 1, the renderer 138 or the processor(s) 112 control the buffer(s) 140. For example, the renderer 138 or the processor(s) 112 may organize data frames in the buffer(s) 140 based on a playout order of the data frames. Additionally, in implementations in which the second spatial audio data 173 is received from the second audio output device 150, the renderer 138 or the processor(s) 112 may combine the second spatial audio data 173 and the decoded first spatial audio data 126 to generate combined audio data 142 that is stored in the buffer(s) 140. In a particular aspect, the renderer 138 or the processor(s) 112 are configured to time-align a data frame of the decoded first spatial audio data 126 with a corresponding data frame of the second spatial audio data 173 to generate a data frame of the combined audio data 142. The combined audio data 142 includes audio that represents the entire three-dimensional (3D) sound field, or a portion of the 3D sound field to be output by the first audio output device 110 (e.g., a left channel of audio of the 3D sound field).

The renderer 138 is configured to provide audio output based on a particular data frame stored in the buffer(s) 140 to the loudspeaker 144 for playout at a time that is based on the first reference time 128, the second reference time 168, or both. For example, the renderer 138 may cause a data frame (which may be a data frame of the combined audio data 142) to be played out by the loudspeaker 144 when the local clock 130 indicates a time value that corresponds to a reference time value associated with the data frame.

In some implementations, the first audio output device 110 also includes one or more motion sensors 148 coupled to the processor(s) 112, to the renderer 138, or both. The motion sensor(s) 148 are configured to generate motion data indicating motion of the first audio output device 110. For example, when the first audio output device 110 is configured to be worn on or about a head of a user, such as when the personal audio apparatus 104 include headphones or ear buds, the motion data represents head motion of the user. In such implementations, the motion data may be used to modify the combined audio data 142 to generate data representing a rotated version of the 3D sound field. In some implementations, the second audio output device 150 also includes one or more motion sensor(s) 188 coupled to one or more processor 152, to a renderer 178, or both, and configured to generate motion data indicating motion of the second audio output device 150. In some implementations, the motion data from one of the audio output devices 110, 150 is used by both of the audio output devices 110, 150. For example, the data 133 sent from the first audio output device 110 to the second audio output device 150 may include motion data from the motion sensor(s) 148. In this example, the second audio output device 150 may omit the motion sensor(s) 188, or the motion sensor(s) 188 may be present but unused.

In the example illustrated in FIG. 1, the second audio output device 150 includes duplicate instances of each component that is present in the first audio output device 110. For example, in FIG. 1, the second audio output device 150 includes one or more processors 152, a memory 154, a reference time generator 164, first communication components to facilitate communication with the host device 102, second communication components to facilitate communication with the first audio output device 110, a local clock 170, and audio output components. The memory 154 stores instructions 156 that are executable by the processor(s) 152 to perform one or more of the functions or operations of the second audio output device 150. In the example illustrated in FIG. 1, the first communication components of the second audio output device 150 include a receiver 158, a modem 160, and a codec 162; the second communication components of the second audio output device 150 include a transceiver 172, an encoder 174, and a decoder 176; and the audio output components of the second audio output device 150 include one or more loudspeakers 184 and a renderer 178, which includes or is coupled to one or more buffers 180.

In a particular implementation, each of the components of the second audio output device 150 is configured to operate in the same manner as the corresponding component of the first audio output device 110. For example, the receiver 158, the modem 160, the codec 162, or a combination thereof, are coupled the processor(s) 152 and configured to provide data obtained from the host device 102 to the processor(s) 152 for further processing. In this example, the receiver 158 is configured to receive a data stream (e.g., the second data stream 103B) that includes at least a portion of the spatial audio data from the host device 102 via the wireless transmissions 106. In some implementations, the second data stream 103B is identical to the first data stream 103A. In other implementations, the second data stream 103B is different than the first data stream 103A. For example, the first data stream 103A may encode a first set of spatial audio data, and the second data stream 103B may encode a second set of spatial audio data. To illustrate, the first set of spatial audio data may include a first set of ambisonics coefficients and the second set of spatial audio data may include a second (different) set of ambisonics coefficients. As another illustrative example, the first set of spatial audio data may include data frames representing first time periods and the second set of spatial audio data may include data frames representing second (different) time periods.

Continuing with the example above, the modem 160 is configured to demodulate signals from the receiver 158 and to provide the demodulated signals to the codec 162, which is configured to, for example, process the signals received from the modem 160 to generate decoded second spatial audio data 166. In this example, the reference time generator 164 determines (e.g., based on the local clock 170) when a particular data frame was received and assigns a second reference time 168 to the particular data frame based on an amount of time (e.g., a playback delay) that the second audio output device 150 uses to generate sound based on the particular data frame, which may include time used to exchange the data 133, 173 with the first audio output device 110 to enable the first audio output device 110 and the second audio output device 150 to synchronize generation of the first sound output 146 and the second sound output 186.

In this example, the transceiver 172, the encoder 174, the decoder 176, or a combination thereof, facilitate the data exchange with the first audio output device 110. To illustrate, the encoder 174 is configured to encode the second spatial audio data 173, the second reference time 168, or both, for transmission by the transceiver 172. Additionally, or alternatively, when the transceiver 172 receives the data 133, the first reference time 128, or both, from the first audio output device 110, the decoder 176 decodes and stores the received data at a buffer of the buffer(s) 180.

Continuing this example, the renderer 178 or the processor(s) 152 control the buffer(s) 180. Additionally, in implementations in which at least a portion of the spatial audio data is received from the first audio output device 110, the renderer 178 or the processor(s) 152 combine the second spatial audio data 173 and the portion of the first spatial audio data to generate combined audio data 182 that is stored in the buffer(s) 180. In a particular aspect, the renderer 178 or the processor(s) 152 are configured to time-align a data frame of the portion of the first spatial audio data with a corresponding data frame of the second spatial audio data 173 to generate a data frame of the combined audio data 182. The renderer 138 is configured to provide audio output based on a particular data frame stored in the buffer(s) 180 to the loudspeaker 184 for playout, as the second sound output 186, at a time that is based on the first reference time 128, the second reference time 168, or both.

Although the first and second audio output devices 110, 150 are illustrated in FIG. 1 as substantially duplicate instances of the same hardware, in other examples, the first and second audio output devices 110, 150 differ from one another. To illustrate, in some implementations, such as in the example illustrated in FIG. 6, the first audio output device 110 is configured to communicate with the host device 102 to receive spatial audio data, and the second audio output device 150 is configured to communicate with the first audio output device 110 to receive at least a portion of the spatial audio data. In this example, the receiver 158, the modem 160, and the codec 162 may be omitted from the second audio output device 150.

In various implementations, the audio output devices 110, 150 have more or fewer components than illustrated in FIG. 1. In a particular implementation, the processor(s) 112, 152 include one or more central processing units (CPU), one or more digital signal processors (DSPs), one or more other single-core or multi-core processing devices, or a combination thereof (e.g., a CPU and a DSP). The processor(s) 112, 152 may include a speech and music coder-decoder (CO-DEC) that includes a voice coder ("vocoder") encoder, a vocoder decoder, or a combination thereof.

In a particular implementation, portions of the first audio output device 110, portions of the second audio output device 150, or both, may be included in a system-in-package or system-on-chip device. In a particular implementation, the memory 114, the processor(s) 112, the receiver 118, the modem 120, the codec 122, the reference time generator 124, the local clock 130, the transceiver 132, the encoder 134, the decoder 136, the renderer 138, the buffer(s) 140, or a subset or combination thereof are included in a system-in-package or system-on-chip device. In a particular implementation, the memory 154, the processor(s) 152, the receiver 158, the modem 160, the codec 162, the reference time generator 164, the local clock 170, the transceiver 172, the encoder 174, the decoder 176, the renderer 178, the buffer(s) 180, or a subset or combination thereof are included in a system-in-package or system-on-chip device.

In a particular aspect, the system 100 facilitates generation of time aligned output based on spatial audio data (e.g., the first and second sound output 146, 186) by the first and second audio output devices 110, 150, by exchanging data between first and second audio output devices 110, 150.

Figure 2:
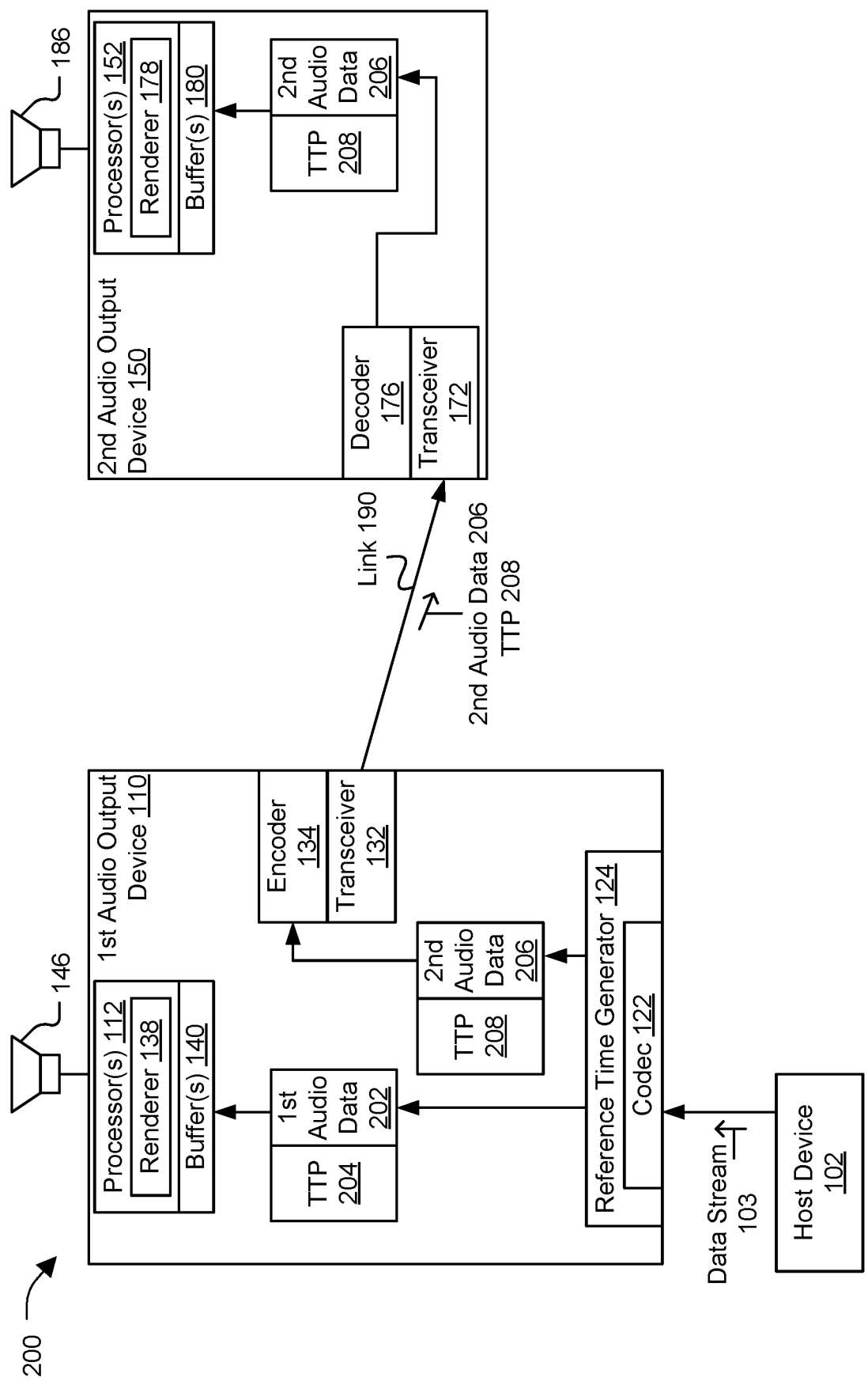
FIG. 2 is a block diagram of a particular illustrative example of the system of FIG. 1, in accordance with some aspects of the present disclosure.

FIG. 2 is a block diagram of a particular illustrative example 200 of the system 100 of FIG. 1, in accordance with some aspects of the present disclosure. The example 200 illustrates the first audio output device 110, the second audio output device 150, and the host device 102. In the example 200 of FIG. 2, the first audio output device 110 and the second audio output device 150 may include each component illustrated in FIG. 1, in which case certain components have been omitted from FIG. 2 in order to emphasize particular aspects of the example 200. In some implementations, one or more of the components of the first audio output device 110 and the second audio output device 150 that are shown in FIG. 1 but not shown in FIG. 2 are omitted from the first audio output device 110 and the second audio output device 150. To illustrate, the first audio output device 110, the second audio output device 150, or both, may include one or more motion sensors 148, 188, as in FIG. 1. As another illustrative example, in the example 200, communication between the first audio output device 110 and the second audio output device 150 is unidirectional. As such, the first audio output device 110 may omit the decoder 136. However, in other implementations, the decoder 136 may be present and unused in a particular operation mode corresponding to the example 200. To illustrate, in some implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 200 of FIG. 2.

In the example 200 of FIG. 2, the host device 102 sends a data stream 103 including encoded spatial audio data to the first audio output device 110 via the wireless transmissions 106 of FIG. 1. In the example 200, the data stream 103 includes or corresponds to both of the data streams 103A and 103B of FIG. 1. For example, the data stream 103 includes the entire content of the spatial audio data that is to be output by both the first audio output device 110 and the second audio output device 150. As described with reference to FIG. 1, the spatial audio data is represented via a set of data frames, which may include ambisonics coefficients, PCM data, ESD data, or other spatial audio data representations.

The codec 122 of the first audio output device 110 decodes the spatial audio data of the data stream 103 to generate first audio data 202 and second audio data 206. In the example 200, each data frame of the first audio data 202 includes data representing a complete data frame of the spatial audio data. Likewise, each data frame of the second audio data 206 includes data representing a complete data frame of the spatial audio data. In a particular implementation, the second audio data 206 is a copy of the first audio data 202. For example, if the spatial audio data is represented using first-order ambisonics, the first audio data 202 includes four sets of ambisonics coefficients, and the second audio data 206 also includes the four sets of ambisonics coefficients. In other examples, the first audio data 202 and the second audio data 206 each include ESD data or PCM data, or another other spatial audio data representation.

The reference time generator 124 assigns a time-to-play 204 (TTP) to each data frame of the first audio data 202 and assigns a TTP 208 to each data frame of the second audio data 206. In a particular implementation, each TTP 204, 208 represents a rendering time at which the renderer 138, 178 is to cause a respective loudspeaker 144, 184 to playout sound corresponding to the data frame to which the TTP 204, 208 is assigned. Each TTP 204, 208 is assigned in a manner that takes into account delay associated with transcoding data frames for transmission to the second audio output device 150 and other delays (if any) associated with synchronizing output at the audio output devices 110, 150.

In the example 200, the encoder 134 at the first audio output device 110, encodes each data frame of the second audio data 206 and the TTP 208 associated with the data frame. The transceiver 132 sends the data frames of the second audio data 206 and the TTPs 208 via the link 190 to the second audio output device 150.

The transceiver 172 of the second audio output device 150 receives the data frames of the second audio data 206 and the corresponding TTPs 208. The decoder 176 decodes the received data. The data frames of the second audio data 206 and the corresponding TTPs 208 are stored at the buffer(s) 180 until a playout time indicated by each TTP 208 is reached. Similarly, the data frames of the first audio data 202 and the corresponding TTPs 204 are stored at the buffer(s) 140 until a playout time indicated by each TTP 204 is reached.

At a playout time indicated by a TTP 204, the renderer 138 retrieves the corresponding data frame of the first audio data 202 from the buffer(s) 140 and causes the loudspeaker 144 to output sound corresponding to the data frame. Similarly, at a playout time indicated by a TTP 208, the renderer 178 retrieves the corresponding data frame of the second audio data 206 from the buffer(s) 180 and causes the loudspeaker 184 to output sound corresponding to the data frame.

In some implementations, the link 190 includes a clock signal, such as the clock signal 192 of FIG. 1, to facilitate synchronization of the output from the first and second audio output devices 110, 150. In other implementations, local clocks (e.g., the local clocks 130, 170) are synchronized before playout of audio begins, and the local clocks synchronize the output from the first and second audio output devices 110, 150. In such implementations, synchronization of the local clocks may be rechecked or updated periodically or occasionally. In still other implementations, a signal from the host device 102 is used to synchronize the output from the first and second audio output devices 110, 150.

Figure 3:
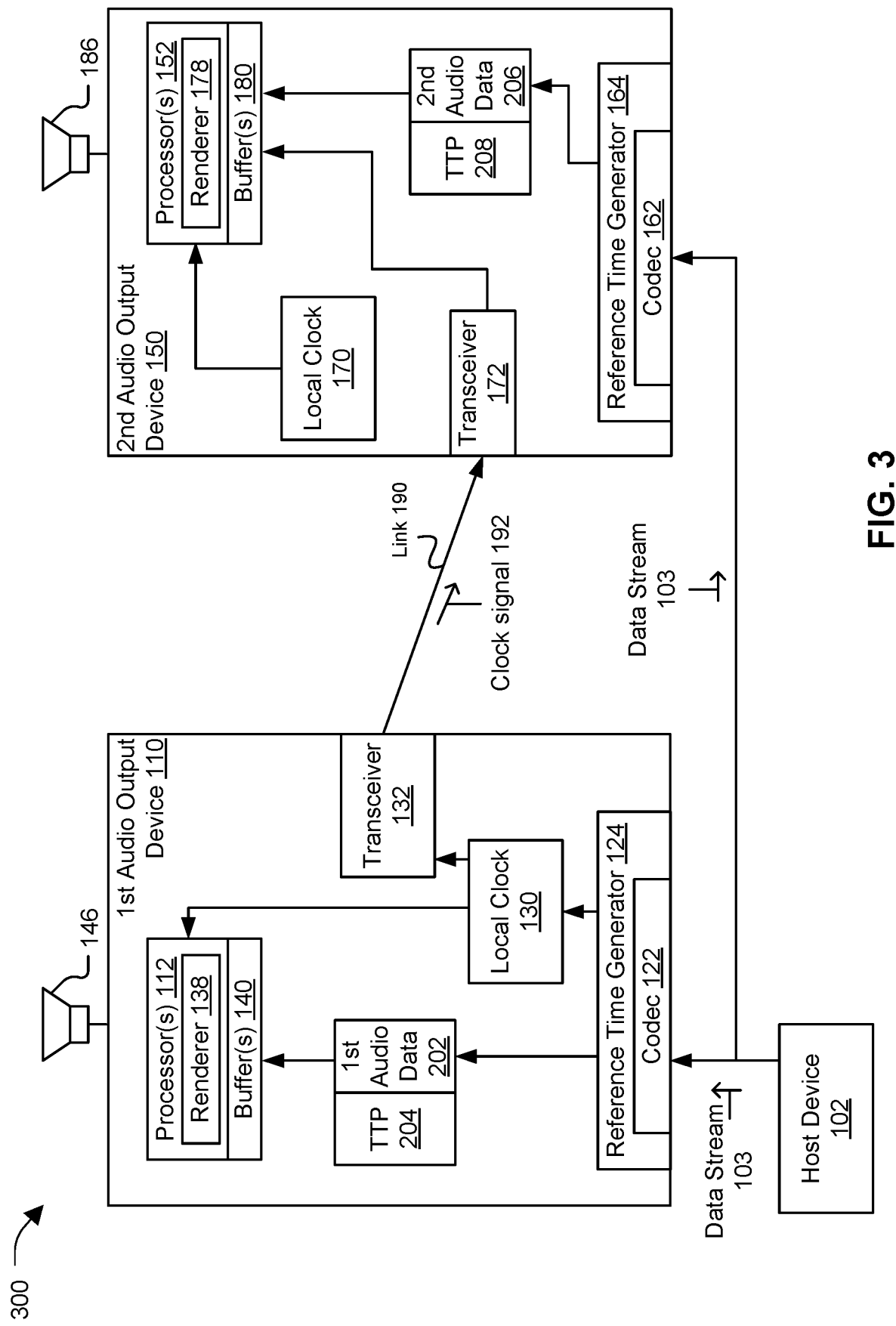
FIG. 3 is a block diagram of another particular illustrative example of the system of FIG. 1, in accordance with some aspects of the present disclosure.

FIG. 3 is a block diagram of another particular illustrative example 300 of the system 100 of FIG. 1, in accordance with some aspects of the present disclosure. The example 300 illustrates the first audio output device 110, the second audio output device 150, and the host device 102. In the example 300 of FIG. 3, the first audio output device 110 and the second audio output device 150 may include each component illustrated in FIG. 1, in which case certain components have been omitted from FIG. 3 in order to emphasize particular aspects of the example 300. In some implementations, one or more of the components of the first audio output device 110 and the second audio output device 150 that are shown in FIG. 1 but not shown in FIG. 3 are omitted from the first audio output device 110 and the second audio output device 150. To illustrate, the first audio output device 110, the second audio output device 150, or both, may include one or more motion sensors 148, 188, as in FIG. 1. As another illustrative example, in the example 300, communication between the first audio output device 110 and the second audio output device 150 does not include encoded audio data. As such, the first audio output device 110 may omit the encoder 134 and the decoder 136, and the second audio output device 150 may omit the encoder 174 and the decoder 176. However, in other implementations, one or more of the encoder 134, the decoder 136, the encoder 174, and the decoder 176 may be present and unused in a particular operation mode corresponding to the example 300.

In the example 300 of FIG. 3, the host device 102 sends the data stream 103 including encoded spatial audio data to the first audio output device 110 and the second audio output device 150 via the wireless transmissions 106 of FIG. 1. In some implementations, the host device 102 sends the data stream 103 only to the first audio output device 110 (e.g., the data stream 103 is a unicast stream addressed to the first audio output device 110). In such implementations, in the example 300, the second audio output device 150 sniffs (e.g., monitors communications between) the host device 102 and the first audio output device 110 such that the second audio output device 150 receives substantially the same data as the first audio output device 110. In such implementations, various schemes may be used to ensure that the second audio output device 150 receives all the packets of the data stream 103. For example, a combined acknowledgement (ACK) process can be used in which the host device 102 receives an ACK indication from each audio output device 110, 150, or receives a single ACK indication that indicates that both audio output devices 110, 150 received a particular packet or set of packets. In other implementations, the data stream 103 is a broadcast or multicast transmission addressed to enable both the first audio output device 110 and the second audio output device 150 to receive the data stream 103.

In the example 300, the data stream 103 includes the entire content of the spatial audio data that is to be output by both the first audio output device 110 and the second audio output device 150. As described with reference to FIG. 1, the spatial audio data is represented via a set of data frames, which may include ambisonics coefficients, PCM data, ESD data, or other spatial audio data representations.

The codec 122 of the first audio output device 110 decodes the spatial audio data of the data stream 103 to generate the first audio data 202, and the codec 162 of the second audio output device 150 decodes the spatial audio data of the data stream 103 to generate the second audio data 206. In the example 300, each data frame of the first audio data 202 includes data representing a complete data frame of the spatial audio data. Likewise, each data frame of the second audio data 206 includes data representing a complete data frame of the spatial audio data.

The reference time generator 124 of the first audio output device 110 assigns a TTP 204 to each data frame of the first audio data 202, and the data frame and the assigned TTP 204 are stored at the buffer(s) 140. The reference time generator 164 of the second audio output device 150 assigns a TTP 208 to each data frame of the second audio data 206, and the data frame and the assigned TTP 208 are stored at the buffer(s) 180.

The local clock 130 of the first audio output device 110 generates a clock signal 192 that is continuously, periodically, or occasionally transmitted, via the link 190, to the second audio output device 150. In a particular implementation, the clock signal 192 is used to synchronize the local clock 170 of the second audio output device 150 with the local clock 130 of the first audio output device 110. In another implementation, the second audio output device 150 uses the clock signal 192 to determine an offset or misalignment between the local clock 170 of the second audio output device 150 and the local clock 130 of the first audio output device 110. In this implementation, the second audio output device 150 accounts for the offset when determining whether a TTP 208 of a particular data frame of the second audio data 206 has been reached.

When the local clock 130 of the first audio output device 110 indicates a time that corresponds to a TTP 204 of a particular data frame of the first audio data 202, the renderer 138 retrieves the particular data frame from the buffer(s) 140 and causes the loudspeaker 144 to output sound corresponding to the data frame. Similarly, when the local clock 170 of the second audio output device 150 indicates a time that corresponds to a TTP 204 of a particular data frame of the second audio data 206, the renderer 178 retrieves the particular data frame of the second audio data 206 from the buffer(s) 180 and causes the loudspeaker 184 to output sound corresponding to the data frame. Thus, in the example 300, the data frames of the first audio data 202 and the second audio data 206 are time aligned based on the shared clock signal 192.

Figure 4:
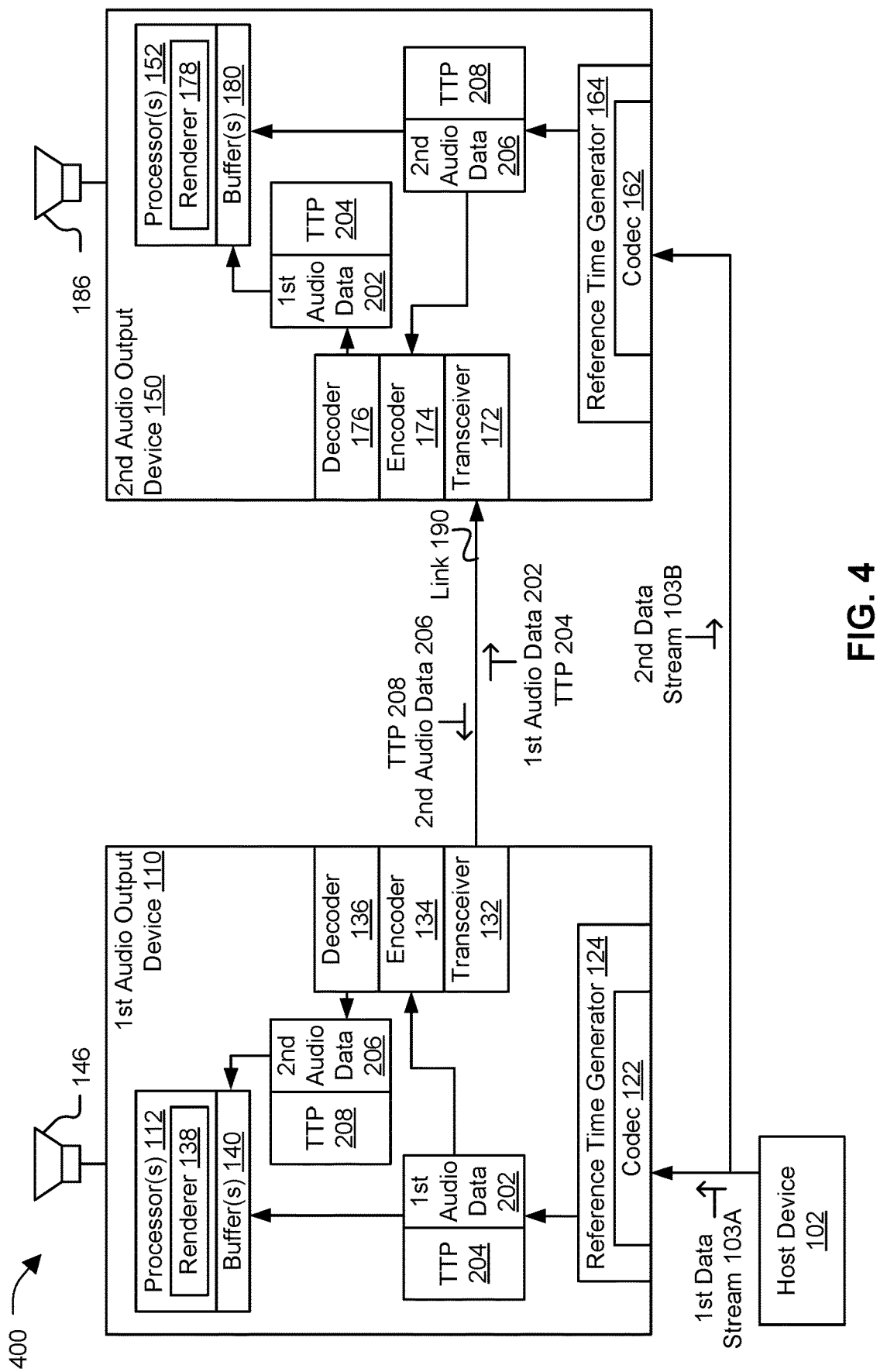
FIG. 4 is a block diagram of another particular illustrative example of the system of FIG. 1, in accordance with some aspects of the present disclosure.

FIG. 4 is a block diagram of another particular illustrative example 400 of the system 100 of FIG. 1, in accordance with some aspects of the present disclosure. The example 400 illustrates the first audio output device 110, the second audio output device 150, and the host device 102. In the example 400 of FIG. 4, the first audio output device 110 and the second audio output device 150 may include each component illustrated in FIG. 1, in which case certain components have been omitted from FIG. 4 in order to emphasize particular aspects of the example 400. In some implementations, one or more of the components of the first audio output device 110 and the second audio output device 150 that are shown in FIG. 1 but not shown in FIG. 4 are omitted from the first audio output device 110 and the second audio output device 150. To illustrate, the first audio output device 110, the second audio output device 150, or both, may include one or more motion sensors 148, 188, as in FIG. 1. As another illustrative example, in the example 400, the first audio output device 110, the second audio output device 150 or both, may include a local clock, which is not shown in FIG. 4. In other implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 400 of FIG. 4.

In the example 400 of FIG. 4, the host device 102 sends, via the wireless transmissions 106 of FIG. 1, the first data stream 103A to the first audio output device 110 and the second data stream 103B to the second audio output device 150. In the example 400, the first data stream 103A encodes a portion of the spatial audio data representing a 3D sound field and the second data stream 103B encodes a remainder of the spatial audio data representing the 3D sound field. For example, if the spatial audio data uses L channels or sets of coefficients to represent an entire 3D sound field, the first data stream 103A includes M of the channels or sets of coefficients and the second data stream 103B includes N of the channels or sets of coefficients, where M+N=L. To illustrate, if the 3D sound field is encoded into spatial audio data using first-order ambisonics, the spatial audio data may include four sets of ambisonics coefficients. In this illustrative example, the first data stream 103A may include two set of ambisonics coefficients, and the second data stream 103B may include the other two sets of ambisonics coefficients. Similar divisions of the ambisonics coefficients may be used for higher-order (e.g., second or third-order) ambisonics. In another illustrative example, if the 3D sound field is encoded into an ESD representation mapped to four channels corresponding to four virtual loudspeakers, the first data stream 103A may include two of the channels, and the second data stream 103B may include the other two channels.

The codec 122 of the first audio output device 110 decodes the portion of the spatial audio data that is received via the first data stream 103A to generate the first audio data 202. In the example 400, each data frame of the first audio data 202 includes data representing a subset (e.g., a first portion) of the spatial audio data. The reference time generator 124 assigns a TTP 204 to each data frame of the first audio data 202. Each data frame of the first audio data 202 and the corresponding TTP 204 are stored in the buffer(s) 140 and provided to the encoder 134. The encoder 134 encodes the data frames of the first audio data 202 and the corresponding TTPs 204, and the transceiver 132 transmits the data frames of the first audio data 202 and the corresponding TTPs 204 to the second audio output device 150 via the link 190.

The codec 162 of the second audio output device 150 decodes the portion of the spatial audio data that is received via the second data stream 103B to generate the second audio data 206. In the example 400, each data frame of the second audio data 206 includes data representing a subset (e.g., a second portion) of the spatial audio data. The reference time generator 164 assigns a TTP 208 to each data frame of the second audio data 206. Each data frame of the second audio data 206 and the corresponding TTP 208 are stored in the buffer(s) 180 and provided to the encoder 174. The encoder 174 encodes the data frames of the second audio data 206 and the corresponding TTPs 208, and the transceiver 172 transmits the data frames of the second audio data 206 and the corresponding TTPs 208 to the first audio output device 110 via the link 190.

The data frames of the second audio data 206 and the corresponding TTPs 208 received by the first audio output device 110 from the second audio output device 150 are decoded by the decoder 136 and stored at the buffer(s) 140. In a particular implementation, the data frames of the second audio data 206 are time aligned with corresponding data frames of the first audio data 202 based the respective TTPs 204, 208 to generate the combined audio data 142 and the sync reference time 143 (e.g., a TTP of a data frame of the combined audio data 142) of FIG. 1.

Similarly, the data frames of the first audio data 202 and the corresponding TTPs 204 received by the second audio output device 150 from the first audio output device 110 are decoded by the decoder 176 and stored at the buffer(s) 180. In a particular implementation, the data frames of the second audio data 206 are time aligned with corresponding data frames of the first audio data 202 based the respective TTPs 204, 208 to generate the combined audio data 182 and the sync reference time 183 (e.g., a TTP of a data frame of the combined audio data 142) of FIG. 1.

When the playout controller 139 detects that a playout time of a particular data frame has been reached, the renderer 138 retrieves the particular data frame of the combined audio data 142 from the buffer(s) 140 and generates a digital representation of sound corresponding to the particular data frame. The DAC 145 uses the digital representation to cause the loudspeaker 144 to output sound corresponding to the data frame. Similarly, when the playout controller 179 detects that a playout time of a particular data frame has been reached, the renderer 178 retrieves the particular data frame of the combined audio data 182 from the buffer(s) 180 and generates a digital representation of sound corresponding to the particular data frame. A DAC 185 uses the digital representation to cause the loudspeaker 184 to output sound corresponding to the data frame.

In some implementations, the link 190 includes a clock signal, such as the clock signal 192 of FIG. 1, to facilitate synchronization of the output from the first and second audio output devices 110, 150. In other implementations, local clocks (e.g., the local clocks 130, 170) are synchronized before playout of audio begins, and the local clocks synchronize the output from the first and second audio output devices 110, 150. In such implementations, synchronization of the local clocks may be rechecked or updated periodically or occasionally. In still other implementations, a signal from the host device 102 is used to synchronize the output from the first and second audio output devices 110, 150.

Figure 5:
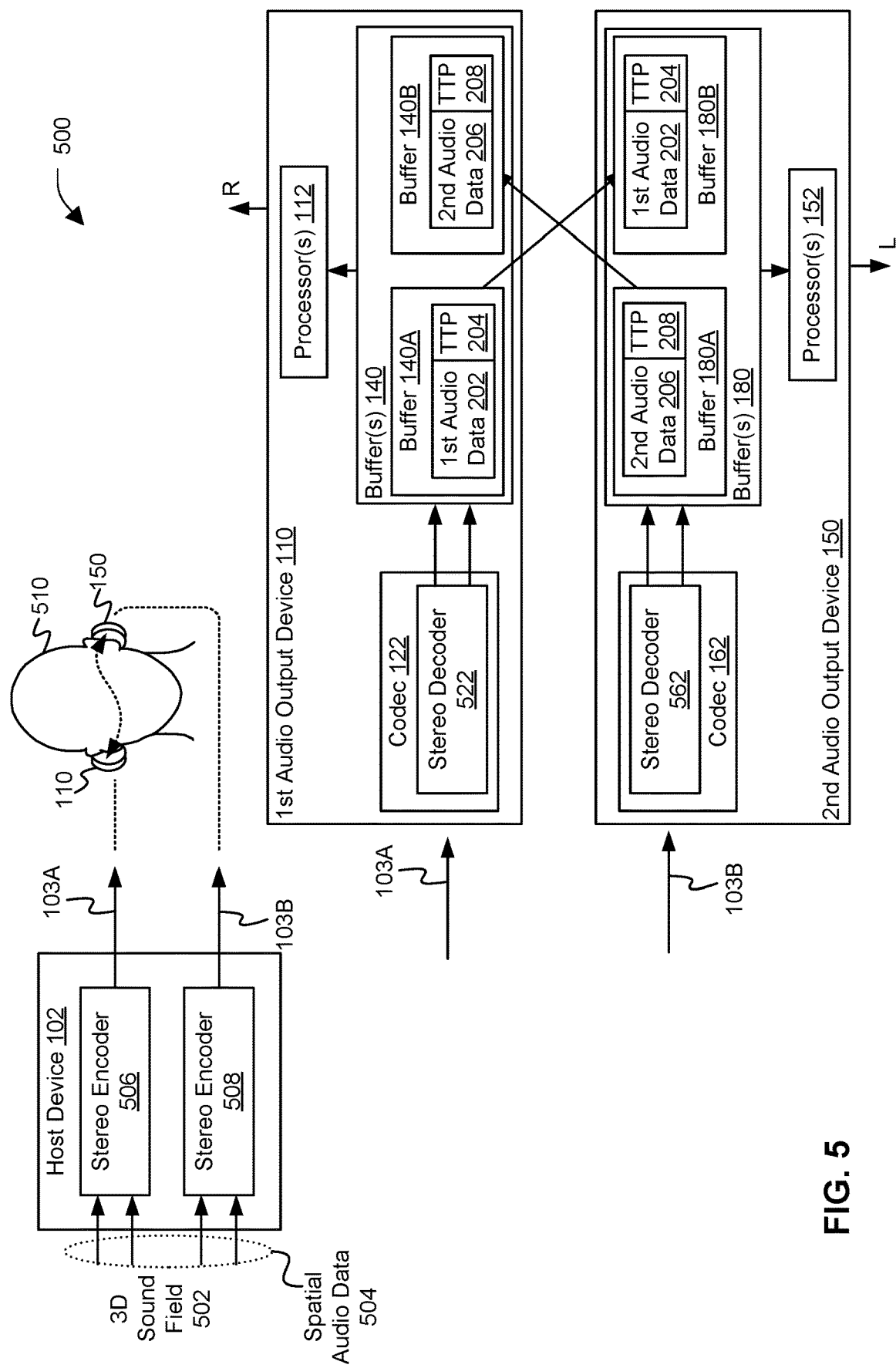
FIG. 5 is a block diagram of another particular illustrative example of the system of FIG. 1, in accordance with some aspects of the present disclosure.

FIG. 5 is a block diagram of another particular illustrative example 500 of the system 100 of FIG. 1, in accordance with some aspects of the present disclosure. The example 500 illustrates the first audio output device 110, the second audio output device 150, and the host device 102. In the example 500 of FIG. 5, the first audio output device 110 and the second audio output device 150 may include each component illustrated in FIG. 1, in which case certain components have been omitted from FIG. 5 in order to emphasize particular aspects of the example 500. In some implementations, one or more of the components of the first audio output device 110 and the second audio output device 150 that are shown in FIG. 1 but not shown in FIG. 5 are omitted from the first audio output device 110 and the second audio output device 150. To illustrate, the first audio output device 110, the second audio output device 150, or both, may include one or more motion sensors 148, 188, as in FIG. 1. As another illustrative example, in the example 500, the first audio output device 110, the second audio output device 150 or both, may include a local clock, which is not shown in FIG. 5. In other implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 500 of FIG. 5.

In the example 500 of FIG. 5, a 3D sound field 502 is encoded to generate spatial audio data 504. In FIG. 5, the spatial audio data 504 includes four channels; however, in other examples the spatial audio data 504 includes more than four channels. In some implementations, the host device 102 captures sound of the 3D sound field 502 to generate the spatial audio data 504. In other implementations, the sound of the 3D sound field 502 is virtual (e.g., represents sound sources in a virtual, mixed, extended, or augmented reality environment), and the host device 102 generates the spatial audio data 504. In still other implementations, the host device 102 receives the spatial audio data 504 from another device, such as a server.

In the example 500, the host device 102 includes two stereo encoders 506, 508. Each stereo encoder 506, 508 is configured to generate one output data stream based on two input data streams. In the example 500, the stereo encoder 506 encodes two channels of the spatial audio data 504 to generate the first data stream 103A, and the stereo encoder 508 encodes the other two channels of the spatial audio data 504 to generate the second data stream 103B.

In the example 500, the first audio output device 110 receives the first data stream 103A, and the codec 122 of the first audio output device 110 decodes the portion of the spatial audio data that is received via the first data stream 103A to generate the first audio data 202 and the TTP 204 for each frame of the first audio data 202. In the example 500, the codec 122 includes or corresponds to a stereo decoder 522 to recreate the two channels of the spatial audio data 504 encoded to generate the first data stream 103A. Data frames of the first audio data 202 and corresponding TTPs 204 are stored at a buffer 140A of the buffer(s) 140. The first audio data 202 and the TTPs 204 are also communicated to the second audio output device 150 (e.g., via the link 190 of FIG. 1) and stored at a buffer 180B. In some implementations, the first audio output device 110 assigns the TTP 204 to each data frame of the first audio data 202 as described above. In other implementations, the host device 102 includes information in the first data stream 103A and the second data stream 103B to enable time-aligning the data frames of the spatial audio data 504. In such implementation, the first and second audio output devices 110 may not assign a TTP to each data frame.

Additionally, in the example 500, the second audio output device 150 receives the second data stream 103B, and the codec 162 of the second audio output device 150 decodes the portion of the spatial audio data that is received via the second data stream 103B to generate the second audio data 206 and the TTP 208 for each frame of the second audio data 206. In the example 500, the codec 162 includes or corresponds to a stereo decoder 562 to recreate the two channels of the spatial audio data 504 encoded to generate the second data stream 103B. Data frames of the second audio data 206 and the corresponding TTPs 208 are stored at a buffer 180A of the buffer(s) 180. The second audio data 206 and the corresponding TTPs 208 are also communicated to the first audio output device 110 (e.g., via the link 190 of FIG. 1) and stored at a buffer 140B.

At a playout time of a particular set of data frames (e.g., as detected by the playout controller 139 of FIG. 1), the renderer 138 retrieves a combined data frame based on a data frame of the first audio data 202 and a corresponding data frame of the second audio data 206 and processes the combined data frame to generate a digital representation of sound that is used to drive the loudspeaker(s) 144 (not shown in FIG. 5). Similarly, at the playout time of the particular set of data frames (e.g., as detected by the playout controller 179 of FIG. 1), the renderer 178 retrieves a combined data frame based on a data frame of the first audio data 202 and a corresponding data frame of the second audio data 206 and processes the combined data frame to generate a digital representation of sound that is used to drive the loudspeaker(s) 184 (not shown in FIG. 5). In the example 500, the first audio output device 110 is associated with a right ear of a user 510, and the first audio output device 110 generates a right output stream to be sent to the loudspeaker(s) 144. Similarly, the second audio output device 150 is associated with a left ear of a user 510, and the second audio output device 150 generates a left output stream to be sent to the loudspeaker(s) 184.

Figure 6:
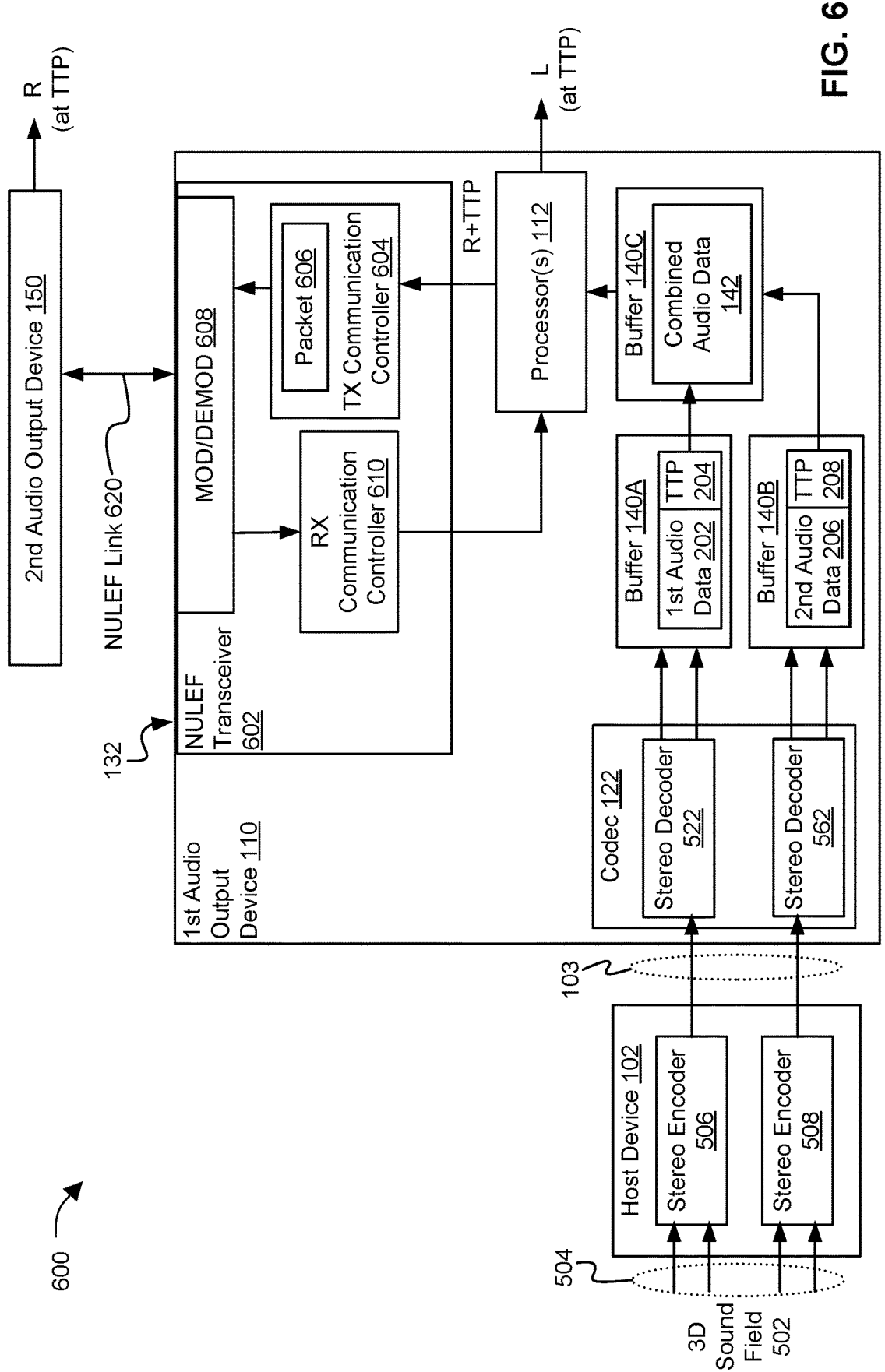
FIG. 6 is a block diagram of another particular illustrative example of the system of FIG. 1, in accordance with some aspects of the present disclosure.

FIG. 6 is a block diagram of another particular illustrative example 600 of the system 100 of FIG. 1, in accordance with some aspects of the present disclosure. The example 600 illustrates the first audio output device 110, the second audio output device 150, and the host device 102. In the example 600 of FIG. 6, the first audio output device 110 and the second audio output device 150 may include each component illustrated in FIG. 1, in which case certain components have been omitted from FIG. 6 in order to emphasize particular aspects of the example 600. In some implementations, one or more of the components of the first audio output device 110 and the second audio output device 150 that are shown in FIG. 1 but not shown in FIG. 6 are omitted from the first audio output device 110 and the second audio output device 150. To illustrate, the first audio output device 110, the second audio output device 150, or both, may include one or more motion sensors 148, 188, as in FIG. 1. As another illustrative example, in the example 600, the second audio output device 150 may duplicate instances of one or more of the components of the first audio output device 110 which are not shown in FIG. 6. In other implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 600 of FIG. 6.

In the example 600 of FIG. 6, the 3D sound field 502 is encoded to generate spatial audio data 504 as described with reference to FIG. 5, and the spatial audio data 504 is transmitted via a data stream 103 to the first audio output device 110. In the example 600, the codec 122 of the first audio output device 110 includes two stereo decoders 522, 562. The stereo decoder 522 decodes a first portion of the data stream 103 to generate the first audio data 202 based on two channels of the spatial audio data 504, and the stereo decoder 562 decodes a second portion of the data stream 103 to generate the second audio data 206 based on the other two channels of the spatial audio data 504. Data frames of the first audio data 202 and the TTP 204 for each data frame of the first audio data 202 are stored at a buffer 140A of the buffer(s) 140, and data frames of the second audio data 206 and the TTP 208 for each data frame of the second audio data 206 are stored at a buffer 140B of the buffer(s) 140. Data frames of the first audio data 202 are time aligned (based on the TTPs 204 and 208) with corresponding data frames of the second audio data 206 and stored as combined audio data 142 at a buffer 140C of the buffer(s) 140.

In the example 600, the processor(s) 112 may perform sound field rotation and channelize the rotated sound field to generate one or more audio channels for output at the first audio output device 110 and one or more audio channels for output at the second audio output device 150. For example, the processor(s) 112 may include the channelizer 137 of FIG. 1, which in the example of FIG. 6 is a binauralizer. In this example, the binauralizer generates binaural audio data (e.g., a left and right output stream) based on each data frame of the combined audio data 142. The processor(s) 112 sends one stream of the binaural audio data (e.g., a stream corresponding to a right ear, designated "R+TTP" in FIG. 6), to the transceiver 132 for transmission to the second audio output device 150. The binaural audio data sent to the second audio output device 150 includes data representing audio for playback by the second audio output device 150 and a time to play out the audio. The processor(s) 112 delays the other stream of the binaural audio data (e.g., a stream corresponding to a left ear, designated "L" in FIG. 6), to the loudspeaker(s) 144 (shown in FIG. 1) for output to a user at the TTP.

In the example 600, the transceiver 132 includes or corresponds to a near ultra-low energy field (NULEF) transceiver 602 that is configured to support a NULEF link 620 between the first audio output device 110 and the second audio output device 150. In this example, the NULEF transceiver 602 includes a transmitter (TX) communication controller 604, a modulator/demodulator 608 ("mod/demod" in FIG. 6, but also referred to herein as a "modem"), and a receiver (RX) communication controller 610. The TX communication controller 604 is configured to generate packets (e.g., a packet 606) based on the binaural audio data from the processor(s) 112. For example, the packet 606 may include data representing right channel audio from one or more data frames of the combined audio data 142 and corresponding time reference (e.g., TTP) data.

The TX communication controller 604 provides each packet 606 to the mod/demod 608. The mod/demod 608 uses one or more of various modulation schemes, such as binary phase-shift keying (BPSK), quadrature phase shift keying (QPSK), offset-keyed quadrature phase shift keying (OKQPSK), and/or quadrature amplitude modulation (QAM) (e.g., 64-QAM, 128-QAM, or 1024-QAM) to modulate a carrier of the NULEF link 620 to represent data of the packet 606. In the example of FIG. 6, the data representing the packet 606 may be transmitted via a magnetic signal (e.g., magnetic inductance) to the second audio output device 150. In other examples, the data representing the packet 606 are transmitted via transverse electromagnetic signals. In a particular aspect, the NULEF link 620 has lower latency and reduced power requirements as compared to one or more radio links (such as a Bluetooth® (registered trademark of Bluetooth SIG Inc., Washington) communication link) with similar data capacity. However, in other implementations, a radio link may be used to transmit the packet 606 to the second audio output device 150.

Figure 7:
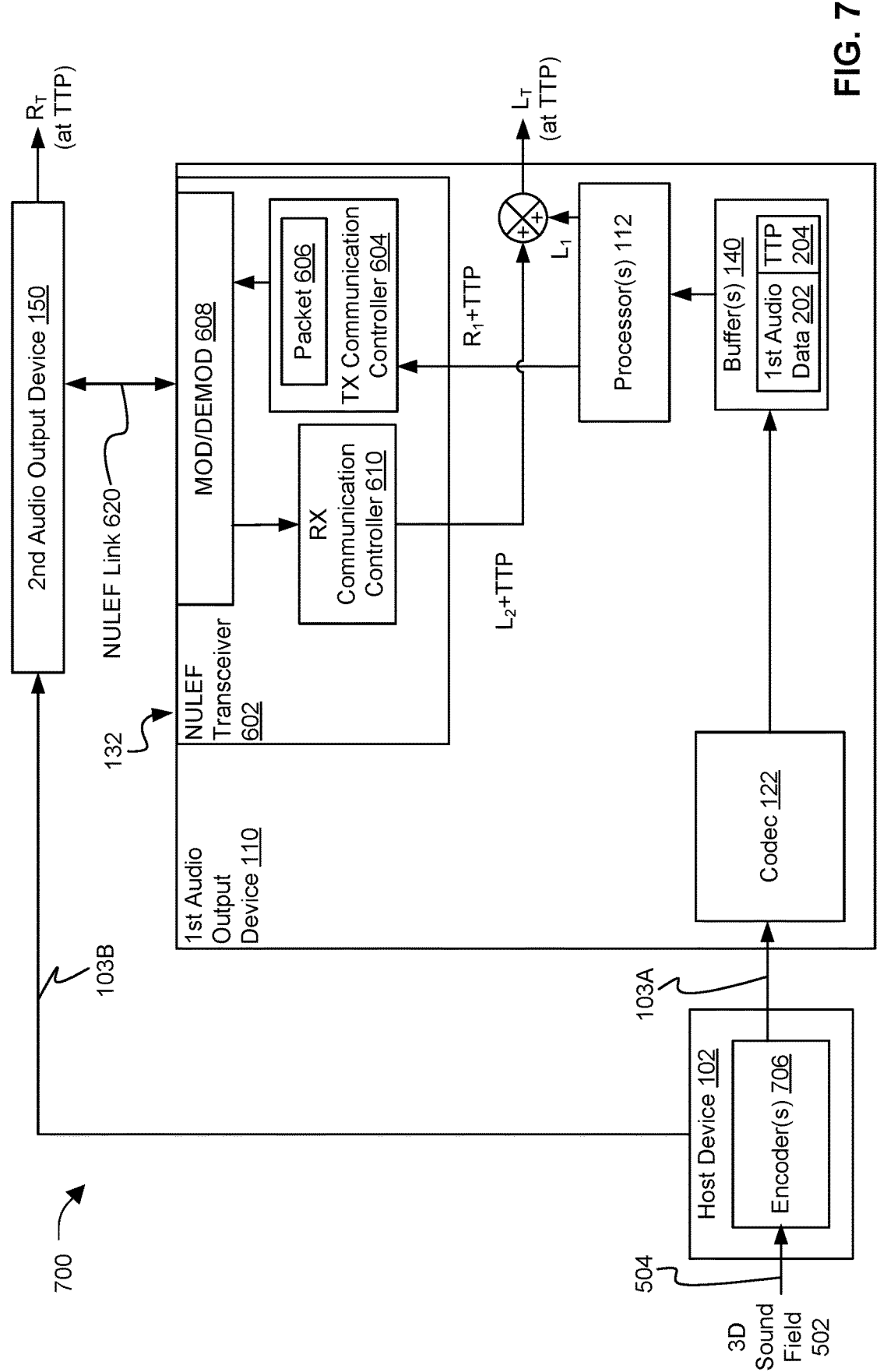
FIG. 7 is a block diagram of another particular illustrative example of the system of FIG. 1, in accordance with some aspects of the present disclosure.

FIG. 7 is a block diagram of another particular illustrative example 700 of the system 100 of FIG. 1, in accordance with some aspects of the present disclosure. The example 700 illustrates the first audio output device 110, the second audio output device 150, and the host device 102. In the example 700 of FIG. 7, the first audio output device 110 and the second audio output device 150 may include each component illustrated in FIG. 1, in which case certain components have been omitted from FIG. 7 in order to emphasize particular aspects of the example 700. In some implementations, one or more of the components of the first audio output device 110 and the second audio output device 150 that are shown in FIG. 1 but not shown in FIG. 7 are omitted from the first audio output device 110 and the second audio output device 150. To illustrate, in the example 700, the second audio output device 150 includes duplicate instances of one or more of the components of the first audio output device 110 which are not shown in FIG. 7. In other implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 700 of FIG. 7.

In the example 700 of FIG. 7, the host device 102 uses higher-order ambisonics to encode the 3D sound field 502 to generate spatial audio data 504. Encoding the 3D sound field 502 using higher-order ambisonics results in more than four sets of ambisonics coefficients. For example, when second-order ambisonics are used, the spatial audio data 504 includes nine sets of ambisonics coefficients.

In FIG. 7, the host device 102 sends a first portion of the spatial audio data 504 via first data stream 103A to the first audio output device 110 and sends a second portion of the spatial audio data 504 via a second data stream 103B to the second audio output device 150. For example, the first data stream 103A may include a subset of the ambisonics coefficients of the spatial audio data 504, and the second data stream 103B may include the remaining ambisonics coefficients of the spatial audio data 504. Alternatively, the first and second data streams 103A, 103B may each include all of the ambisonics coefficients.

The codec 122 of the first audio output device 110 decodes the first data stream 103A to generate first audio data 202, which is stored, with corresponding TTPs 204 of each data frame of the first audio data 202, at the buffer(s) 140. In the example 700, the channelizer 137 includes a binauralizer. The binauralizer generates binaural audio data (e.g., a left and right output stream, labeled "$L_1$" and "$R_1$+TTP", respectively, in FIG. 7) based on each data frame of the first audio data 202. In FIG. 7, a right output stream ($R_1$) and related TTPs are provided to the transceiver 132 for transmission to the second audio output device 150. In the example illustrated in FIG. 7, the transceiver 132 includes or corresponds to the NULEF transceiver 602 of FIG. 6. In other examples, other types of transceivers 132 are used.

The second audio output device 150 also generates binaural audio data (e.g., a left and right output stream) based on each data frame of combined audio data from the second data stream 103B. The second audio output device 150 sends one of the output streams that it generates (e.g., the left output stream, labeled "$L_2$+TTP" in FIG. 7) to the first audio output device 110. The first audio output device 110 combines the $L_2$ output stream from the second audio output device 150 with the $L_1$ output stream for the same TTP to generate a complete left output stream (labeled "$L_T$" in FIG. 7), which is sent to the loudspeaker(s) 144 at the TTP for output as the first sound output 146 of FIG. 1. Similarly, the second audio output device 150 combines the $R_1$ output stream from the first audio output device 110 with an $R_2$ output stream generated at the second audio output device to generate, at the corresponding TTP, a complete right output stream, which is sent to the loudspeaker(s) 184 for output as the second sound output 186 of FIG. 1.

Figure 8:
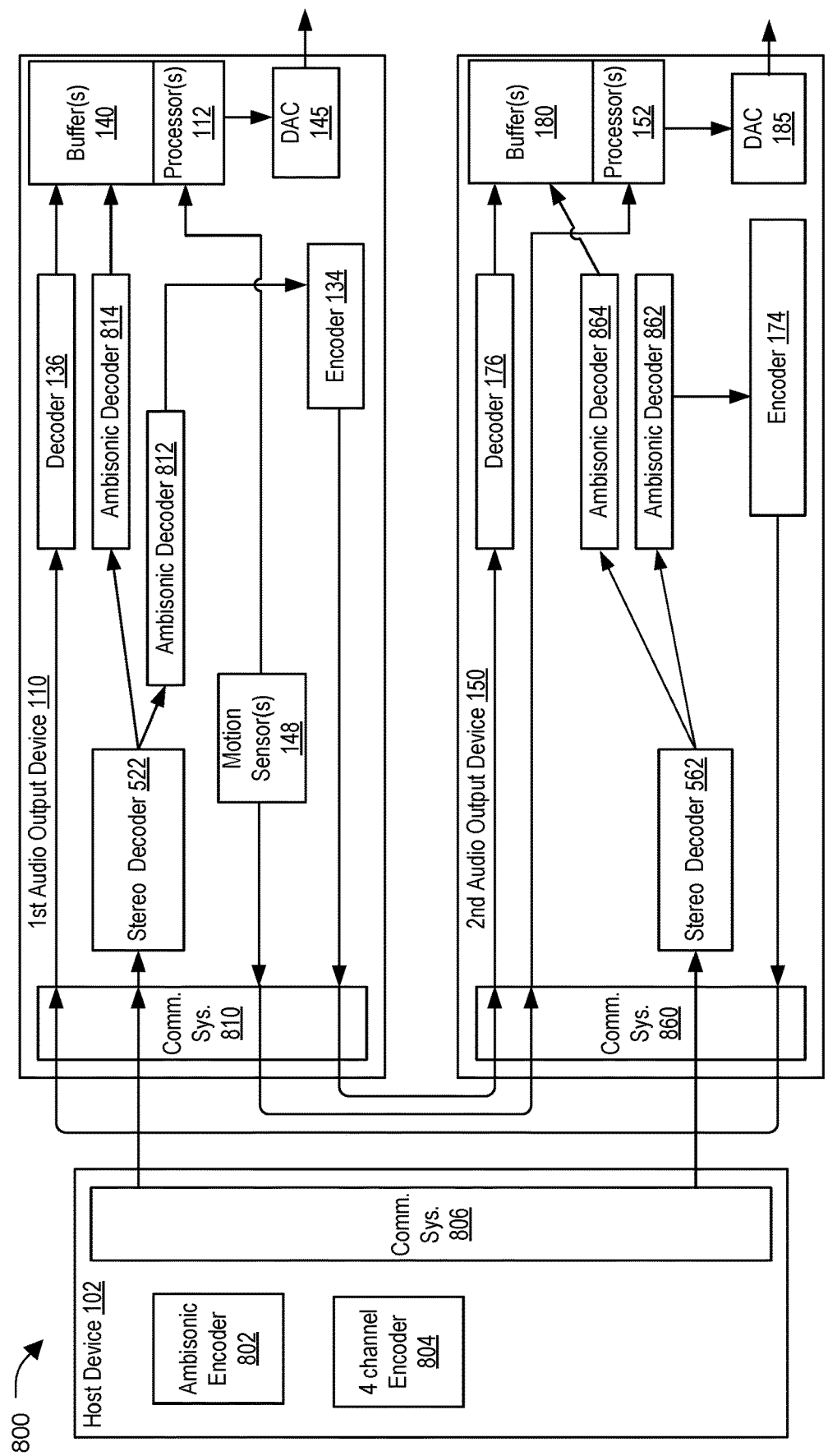
FIG. 8 is a block diagram of another particular illustrative example of the system of FIG. 1, in accordance with some aspects of the present disclosure.

FIG. 8 is a block diagram of another particular illustrative example 800 of the system 100 of FIG. 1, in accordance with some aspects of the present disclosure. The example 800 illustrates the first audio output device 110, the second audio output device 150, and the host device 102.

In the example 800 of FIG. 8, the first audio output device 110 and the second audio output device 150 may include one or more components illustrated in FIG. 1, in which case certain components have been omitted from FIG. 8 in order to emphasize particular aspects of the example 800. In some implementations, one or more of the components of the first audio output device 110 and the second audio output device 150 that are shown in FIG. 1 but not shown in FIG. 8 are omitted from the first audio output device 110 and the second audio output device 150. In other implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 800 of FIG. 8.

In the example 800 of FIG. 8, the host device 102 includes an ambisonics encoder 802 to encode a 3D sound field to generate spatial audio data. In the example illustrated in FIG. 8, the spatial audio data includes four channels (such as channels corresponding to X, Y, Z, and W ambisonics coefficients); however, in other examples the spatial audio data includes more than four channels. In some implementations, the host device 102 captures sound of the 3D sound field to generate the spatial audio data. In other implementations, the sound of the 3D sound field is virtual (e.g., represents sound sources in a virtual, mixed, extended, or augmented reality environment), and the host device 102 generates the spatial audio data. In still other implementations, the host device 102 receives the spatial audio data from another device, such as a server.

In the example 800, the host device 102 includes a four channel encoder 804. To illustrate, the four channel encoder 804 may include or correspond to the two stereo encoders 506, 508 of FIG. 5. The four channel encoder 804 is configured to generate two output data streams based on four input data streams. A communication system 806 of the host device 102 is configured to send the output data streams to the audio output devices 110, 150. To illustrate, the communication system 806 may send a first output data stream (e.g., representing the first data stream 103A of FIG. 1) to the first audio output device 110 and may send a second output data stream (e.g., representing the second data stream 103B of FIG. 1) to the second audio output device 150. Alternatively, in some implementations, both the first and second data streams are sent to a single one of the audio output devices 110, 150 or to each of the audio output devices 110, 150.

In the example 800, a communication system 810 of the first audio output device 110 receives a data stream from the host device 102. The communication system 810 of the first audio output device 110 includes or corresponds to the receiver 118, the modem 120, the codec 122, the transceiver 132 of FIG. 1, or any combination thereof. The communication system 810 provides data derived from the data stream to the stereo decoder 522. The stereo decoder 522 generates two channels of the spatial audio data based on the data received from the communication system 810 and provides each channel of the spatial audio data to a respective ambisonics decoder. For example, a first channel of the spatial audio data is provided to an ambisonics decoder 814 and a second channel of the spatial audio data is provided to an ambisonics decoder 812. Output of the ambisonics decoder 814 is stored to the buffer(s) 140 and output of the ambisonics decoder 812 is encoded, by the encoder 134, for transmission to the second audio output device 150. In some implementations, the encoder 134 is omitted, and the output of the ambisonics decoder 812 is sent to the second audio output device 150 without being re-encoded. In some implementations, the output of the ambisonics decoder 812 is also stored at the buffer(s) 140.

A communication system 860 of the second audio output device 150 receives a data stream from the host device 102. The communication system 860 of the second audio output device 150 includes or corresponds to the receiver 158, the modem 160, the codec 162, the transceiver 172 of FIG. 1, or any combination thereof. The communication system 860 provides data derived from the data stream to the stereo decoder 562. The stereo decoder 562 generates two channels of the spatial audio data based on the data received from the communication system 860 and provides each channel of the spatial audio data to a respective ambisonics decoder. For example, a first channel of the spatial audio data is provided to an ambisonics decoder 864 and a second channel of the spatial audio data is provided to an ambisonics decoder 862. Output of the ambisonics decoder 864 is stored to the buffer(s) 180 and output of the ambisonics decoder 862 is encoded, by the encoder 174, for transmission to the first audio output device 110. In some implementations, the encoder 174 is omitted, and the output of the ambisonics decoder 862 is sent to the first audio output device 110 without being re-encoded. In some implementations, the output of the ambisonics decoder 862 is also stored at the buffer(s) 180.

If the output of the ambisonics decoder 812 is re-encoded for transmission to the second audio output device 150, the decoder 176 of the second audio output device 150 decodes spatial audio data received from the first audio output device 110 and stores the decoded spatial audio data at the buffer(s) 180. Alternatively, if the output of the ambisonics decoder 812 is not re-encoded for transmission to the second audio output device 150, the spatial audio data is stored at the buffer(s) 180. Similarly, the first audio output device 110 stores spatial audio data received from the second audio output device 150 at the buffer(s) 140, which may include decoding the spatial audio data at the decoder 136 prior to storage.

In the example 800 illustrated in FIG. 8, the first audio output device 110 includes the motion sensor(s) 148. In this example, the motion sensor(s) 148 generate motion data that is provided to the processor(s) 112 of the first audio output device 110 and to the processor(s) 152 of the second audio output device 150. At a playout time of a particular set of data frames (e.g., as detected by the playout controller 139 of FIG. 1), the processor(s) 112 (e.g., the renderer 138 of FIG. 1) retrieve one or more data frames (such as data frames output by the ambisonics decoders 812, 814, and/or 862, or a combination thereof (e.g., a data frame of the combined audio data 142 of FIG. 1) and process the data frame(s) with the motion data to generate a digital representation of sound that is provided to the DAC 145 to drive the loudspeaker(s) 144 (not shown in FIG. 8). Similarly, at the playout time of the particular set of data frames (e.g., as detected by the playout controller 179 of FIG. 1), the processor(s) 152 (e.g., the renderer 178 of FIG. 1) retrieve one or more data frames (such as data frames output by the ambisonics decoders 862, 864, and/or 812, or a combination thereof (e.g., a data frame of the combined audio data 182 of FIG. 1) and process the data frame(s) and the motion data to generate a digital representation of sound that is provided to the DAC 185 to drive the loudspeaker(s) 184 (not shown in FIG. 8).

Figure 9:
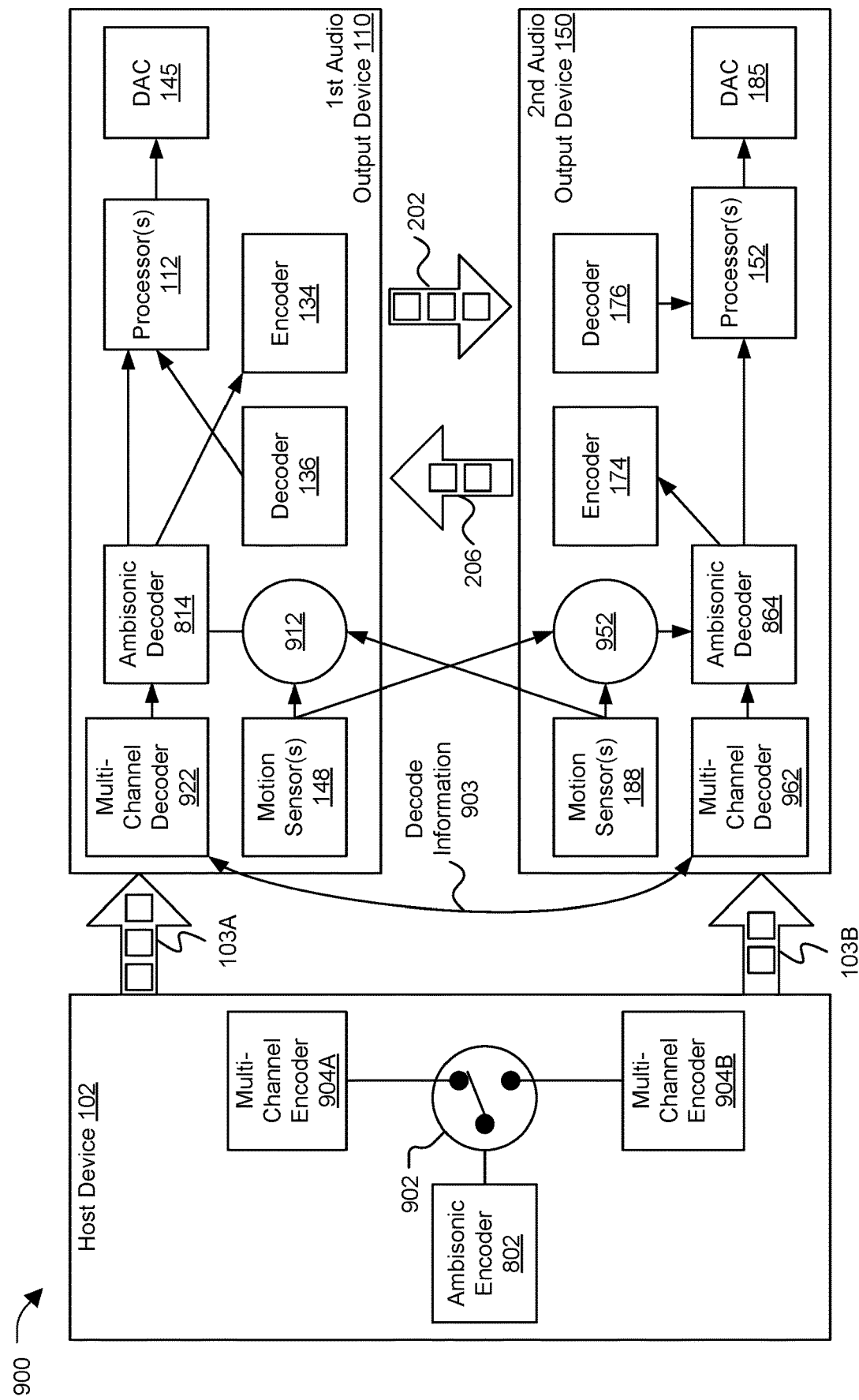
FIG. 9 is a block diagram of another particular illustrative example of the system of FIG. 1, in accordance with some aspects of the present disclosure.

FIG. 9 is a block diagram of another particular illustrative example 900 of the system 100 of FIG. 1, in accordance with some aspects of the present disclosure. The example 900 illustrates the first audio output device 110, the second audio output device 150, and the host device 102. In the example 900 of FIG. 9, the first audio output device 110 and the second audio output device 150 may include each component illustrated in FIG. 1, in which case certain components have been omitted from FIG. 9 in order to emphasize particular aspects of the example 900. In some implementations, one or more of the components of the first audio output device 110 and the second audio output device 150 that are shown in FIG. 1 but not shown in FIG. 9 are omitted from the first audio output device 110 and the second audio output device 150. To illustrate, in the example 900, the first audio output device 110, the second audio output device 150 or both, may include a local clock, which is not shown in FIG. 9. In other implementations, an operating mode of the first audio output device 110 and the second audio output device 150 may be switchable between various examples illustrated in FIGS. 2-9. In such implementations, any combination of the components illustrated in FIGS. 1-9 may be present in the first audio output device 110 and the second audio output device 150 and only a subset of such components may be operable in a particular operating mode represented by the example 900 of FIG. 9.

In the example 900 of FIG. 9, the host device 102 includes an ambisonics encoder 802 to generate ambisonics coefficients to represent a 3D sound field (e.g., the 3D sound field 502 of FIG. 5). The ambisonics encoder 802 is coupled to a switch that is configured to provide the ambisonics coefficients to either a first multi-channel encoder 904A or a second multi-channel encoder 904B. Each multi-channel encoder 904 is configured to generate a data packet including all of the ambisonics coefficients of one or more data frames. The switch 902 periodically changes which multi-channel encoder 904 is selected. As a result, a first data stream 103A sent to the first audio output device 110 includes spatial audio data representing a first set of data frames, and a second data stream 103B sent to the second audio output device 150 includes spatial audio data representing a second set of data frames. In some examples, each data frame of the spatial audio data is included in only a respective one of the data streams 103, and together the data streams 103 include all of the data frames of the spatial audio data. Additionally, in the example 900, the host device 102 adds a reference time (e.g., a TTP) to each data frame.

The first audio output device 110 includes a multi-channel decoder 922 to decode the portion of the spatial audio data received via the first data stream 103A and to provide the decoded spatial audio data to an ambisonics decoder 814. In a particular implementation, the multi-channel decoder 922 uses decode information 903 from the second audio output device 150 to facilitate decoding a first data frame from the first data stream 103A. In such implementations, the decode information 903 includes, for example, intersample correlation information, interframe correlation information, or other data that is used to facilitate decompression of the first data frame based on a prior data frame that was decompressed by the second audio output device 150. Additionally, when a receive time window associated with the first audio output device 110 ends (e.g., when the switch 902 causes data frames to be sent to the second audio output device 150 rather than to the first audio output device 110), the first audio output device 110 sends decode information 903 to the second audio output device 150.

The ambisonics decoder 814 generates first audio data 202 based on the data frames received via the first data stream 103A. The first audio data 202 is provided to processor(s) 112 and to the encoder 134. The encoder 134 encodes the first audio data 202 for transmission to the second audio output device 150. Additionally, the decoder 136 of the first audio output device 110 receives second audio data 206 from the second audio output device 150. The second audio data 206 is generated by a multi-channel decoder 962 and ambisonics decoder 864 of the second audio output device 150 based on data frames of the second data stream 103B.

The processor(s) 112 of the first audio output device 110 combine the first audio data 202 and the second audio data 206 to generate combined audio data. The processor(s) 112 (e.g., the renderer 138 of FIG. 1) provide a digital representation of sound derived from the combined audio data to the DAC 145, and the loudspeaker(s) 144 (not shown in FIG. 9) of the first audio output device 110 are driven based on output of the DAC 145.

In some implementations, the first audio output device 110 also includes the motion sensor(s) 148. In such implementations, the motion sensor(s) 148 generate first motion data indicative of motion of the first audio output device 110. The first motion data may be used to modify the combined audio data in a manner that reproduces or simulates rotation of the 3D sound field. In some implementations, the first motion data is also sent to the second audio output device 150, and second motion data is received from the second audio output device 150. In such implementations, the first audio output device 110 uses the second motion data from the second audio output device 150 to facilitate smoothing the rotation of the 3D sound field.

The second audio output device 150 includes the multi-channel decoder 962 to decode the portion of the spatial audio data received via the second data stream 103B and to provide the decoded spatial audio data to the ambisonics decoder 864. In a particular implementation, the multi-channel decoder 962 uses decode information 903 from the first audio output device 110 to facilitate decoding a particular data frame from the second data stream 103B. Additionally, when a receive time window associated with the second audio output device 150 ends (e.g., when the switch 902 causes data frames to be sent to the first audio output device 110 rather than to the second audio output device 150), the second audio output device 150 sends decode information 903 to the first audio output device 110.

The ambisonics decoder 864 generates the second audio data 206 based on the data frames received via the second data stream 103B. The second audio data 206 is provided to processor(s) 152 and to the encoder 174. The encoder 174 encodes the second audio data 206 for transmission to the first audio output device 110. Additionally, the decoder 176 of the second audio output device 150 receives the first audio data 202 from the first audio output device 110.

The processor(s) 152 of the second audio output device 150 combine the second audio data 206 and the first audio data 202 to generate combined audio data. The processor(s) 152 (e.g., the renderer 178 of FIG. 1) provide a digital representation of sound derived from the combined audio data to the DAC 185, and the loudspeaker(s) 184 (not shown in FIG. 9) of the second audio output device 150 are driven based on output of the DAC 185.

In some implementations, the second audio output device 150 also includes the motion sensor(s) 188. In such implementations, the motion sensor(s) 188 generate second motion data indicative of motion of the second audio output device 150. The second motion data may be used to modify the combined audio data in a manner that reproduces or simulates rotation of the 3D sound field. In some implementations, the second motion data is also sent to the first audio output device 110, and first motion data is received from the first audio output device 110. In such implementations, the second audio output device 150 uses the first motion data from the first audio output device 110 to facilitate smoothing the rotation of the 3D sound field.

Figure 10:
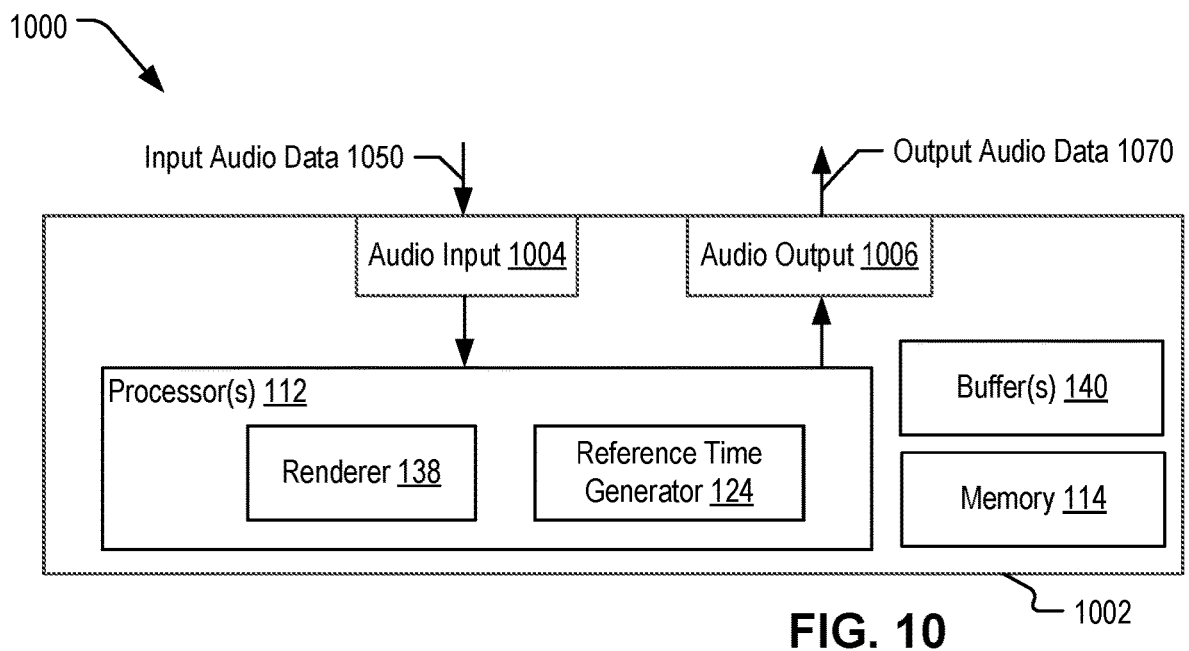
FIG. 10 is a diagram of an integrated circuit, operable to perform data exchange to enable generation of audio output from spatial audio data, in accordance with some examples of the present disclosure.

FIG. 10 is a diagram 1000 of an integrated circuit 1002 that is configured to facilitate synchronized generation of audio output based on spatial audio data, in accordance with some examples of the present disclosure. In FIG. 10, the integrated circuit 1002 includes the processor(s) 112, the buffer(s) 140, and the memory 114. In the example illustrated in FIG. 10, the renderer 138 and the reference time generator 124 are integrated with the processor(s) 112. For example, the processor(s) 112 may execute instructions (e.g., the instructions 116 of FIG. 1) from the memory 114 to perform the operations of the renderer 138, the reference time generator 124, or both. The integrated circuit 1002 also includes an audio input 1004, such as one or more bus interfaces, to enable the input audio data 1050 to be received for processing. The integrated circuit 1002 also includes an audio output 1006, such as a bus interface, to enable sending of an output audio signal 1070. In some implementations, the integrated circuit 1002 includes one or more other components described with reference to FIG. 1, such as the first communication components to facilitate communication with a host device, the second communication components to facilitate communication with another audio output device, and audio output components, one or more motion sensors, or a combination thereof.

Figure 11:
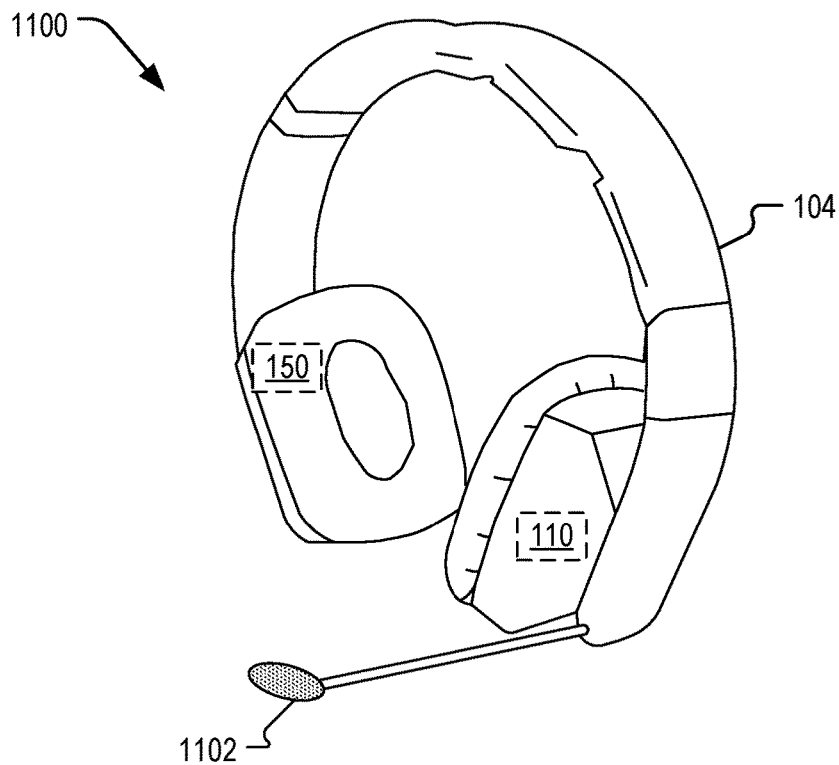
FIG. 11 is a diagram of headphones, operable to perform data exchange to enable generation of audio output from spatial audio data, in accordance with some examples of the present disclosure.

FIG. 11 is a diagram of a headset 1100 (e.g., a particular example of the personal audio apparatus 104 of FIG. 1), such as headphones, operable to perform data exchange to enable generation of synchronized audio output from spatial audio data, in accordance with some examples of the present disclosure. In FIG. 11, a first ear cup of the headset 1100 includes the first audio output device 110, and a second ear cup of the headset 1100 includes the second audio output device 150. The headset 1100 may also include one or more microphones 1102. In a particular example, the audio output devices 110, 150 operate as described with reference to any of FIGS. 1-9.

Figure 12:
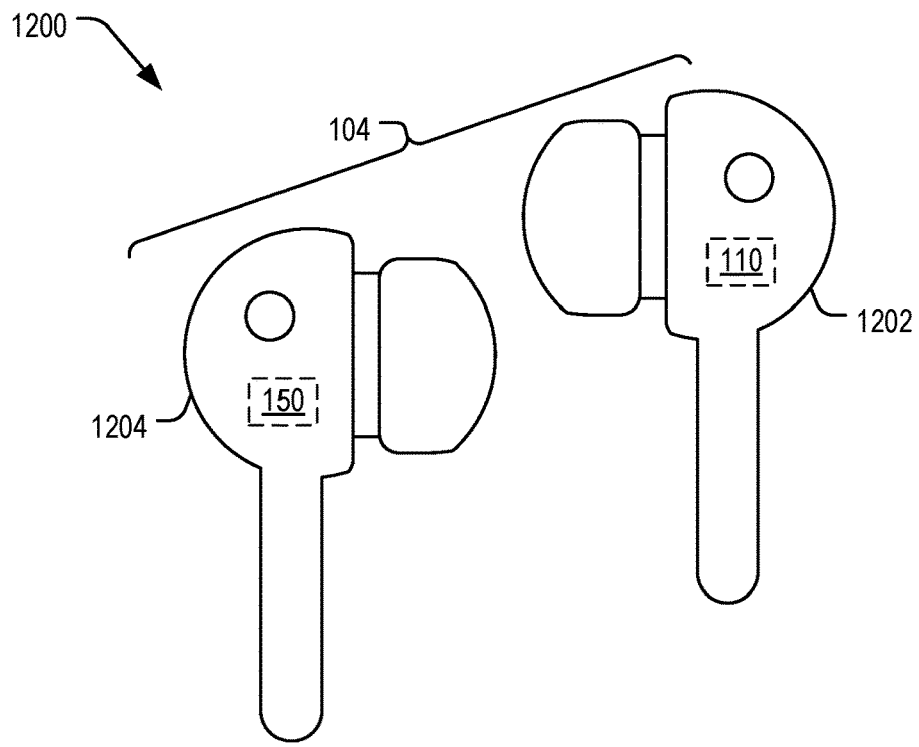
FIG. 12 is a diagram of ear buds, operable to perform data exchange to enable generation of audio output from spatial audio data, in accordance with some examples of the present disclosure.

FIG. 12 is a diagram of ear buds 1200 (e.g., another particular example of the personal audio apparatus 104 of FIG. 1) operable to perform data exchange to enable generation of synchronized audio output from spatial audio data, in accordance with some examples of the present disclosure. In FIG. 12, a first ear bud 1202 includes or corresponds to the first audio output device 110, and a second ear bud 1204 includes or corresponds to the second audio output device 150. One or both of the ear buds 1200 may also include one or more microphones. In a particular example, the audio output devices 110, 150 operate as described with reference to any of FIGS. 1-9.

Figure 13:
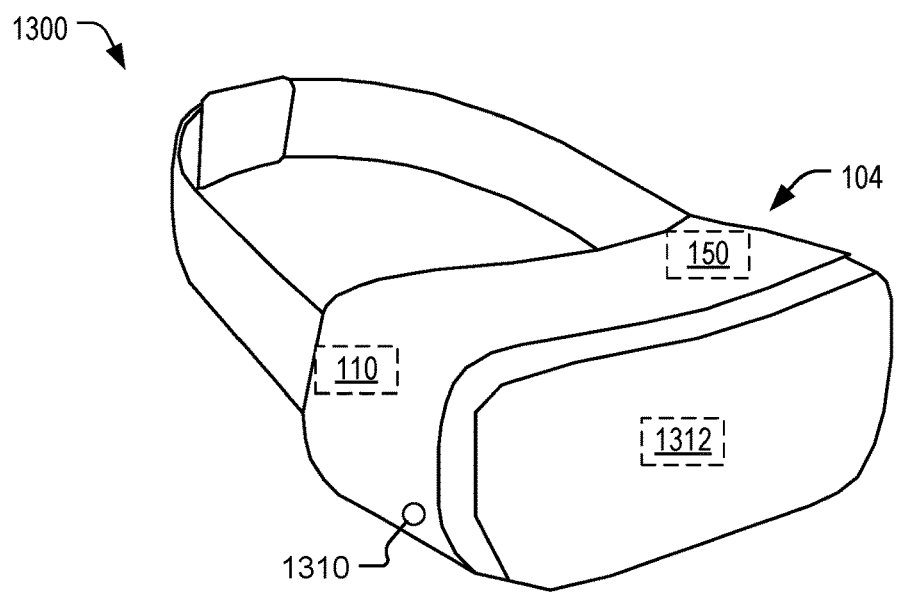
FIG. 13 is a diagram of a headset, such as a virtual reality, mixed reality, extended reality, or augmented reality headset, operable to perform data exchange to enable generation of audio output from spatial audio data, in accordance with some examples of the present disclosure.

FIG. 13 is a diagram of a headset 1300 (e.g., another particular example of the personal audio apparatus 104 of FIG. 1), such as a virtual reality headset, an augmented reality headset, extended reality headset, or mixed reality headset, operable to perform data exchange to enable generation of synchronized audio output from spatial audio data, in accordance with some examples of the present disclosure. In FIG. 13, the first audio output device 110 is included in or coupled to the headset 1300 at a location proximate to a first ear of a user, and the second audio output device 150 is included in or coupled to the headset 1300 at a location proximate to a second ear of the user. The headset 1300 may also include one or more microphones 1310 and one or more display devices 1312. In a particular example, the audio output devices 110, 150 operate as described with reference to any of FIGS. 1-9.

FIG. 14 is an implementation 1400 in which the personal audio apparatus 104 includes or corresponds to a pair of wireless speaker and voice activated devices 1402, 1404. The wireless speaker and voice activated devices 1402, 1404 can have wireless network connectivity and may be configured to execute an assistant operation. In FIG. 14, a first wireless speaker and voice activated device 1402 includes or corresponds to the first audio output device 110, and a second wireless speaker and voice activated device 1404 includes or corresponds to the second audio output device 150. The wireless speaker and voice activated devices 1402, 1404 operate as described with reference to any of FIGS. 1-9

FIG. 15 depicts another implementation in which the personal audio apparatus 104 corresponds to, or is integrated within, a vehicle 1500, illustrated as a car. The vehicle 1500 includes a display 1520. The first audio output device 110 and the second audio output device 150 are integrated within or coupled to the vehicle 1500. In a particular example, the audio output devices 110, 150 operate as described with reference to any of FIGS. 1-9.

FIG. 16 is a diagram of a particular implementation of a method 1600 of generating audio output based on spatial audio data performed by one or more of audio output devices 110, 150 of FIG. 1-15, in accordance with some examples of the present disclosure. In a particular aspect, one or more operations of the method 1600 are performed by at least one of the first audio output device 110, the processor(s) 112, the receiver 118, the transceiver 132, the reference time generator 124, the renderer 138, the second audio output device 150, the receiver 158, the transceiver 172, the reference time generator 164, the renderer 178 of any of FIGS. 1-9, or a combination of one or more components thereof.

The method 1600 includes, at block 1602, obtaining, at a first audio output device of a personal audio apparatus, first spatial audio data and a first reference time associated with the first spatial audio data. For example, the first audio output device 110 of FIGS. 1-15 may obtain the first spatial audio data via the wireless transmissions 106 from the host device 102. In this example, the reference time generator 124 of FIG. 1 may generate the first reference time 128 associated with the first spatial audio data.

The method 1600 includes, at block 1604, causing the first reference time and data representing at least a portion of the first spatial audio data to be transmitted from the first audio output device. For example, the first audio output device 110 may transmit the data 133 and the first reference time 128 to the second audio output device 150. In some implementation, the data 133 includes the first spatial audio data.

The method 1600 includes, at block 1606, receiving, at the first audio output device from a second audio output device of the personal audio apparatus, second spatial audio data and a second reference time associated with the second spatial audio data. For example, the first audio output device 110 may receive, from the second audio output device 150, the second spatial audio data 173 and the second reference time 168.

The method 1600 includes, at block 1608, based on the first reference time and the second reference time, time-aligning the first spatial audio data and the second spatial audio data to generate combined audio data representing a three-dimensional (3D) sound field. For example, the processor(s) 112 or the renderer 138 may time-align a data frame of the first spatial audio data with a corresponding data frame of the second spatial audio data to generate a data frame of the combined audio data 142.

The method 1600 includes, at block 1610, generating audio output based on the combined audio data. For example, the renderer 138 may send audio data based on a data frame of the combined audio data 142 to the loudspeaker(s) 144 for output at a time-to-play associated with the data frame.

The method 1600 of FIG. 16 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1600 of FIG. 16 may be performed by a processor that executes instructions, such as the processor(s) 112 executing the instructions 116 of FIG. 1.

Although the method 1600 of FIG. 16 is described generally from the perspective of the first audio output device 110, the second audio output device 150 may perform the operations of the method 1600 in addition to, or instead of, the first audio output device 110.

FIG. 17 is a diagram of a particular implementation of a method 1700 of generating audio output based on spatial audio data performed by one or more of audio output devices 110, 150 of FIG. 1-15, in accordance with some examples of the present disclosure. In a particular aspect, one or more operations of the method 1700 are performed by at least one of the first audio output device 110, the processor(s) 112, the receiver 118, the transceiver 132, the reference time generator 124, the renderer 138, the second audio output device 150, the receiver 158, the transceiver 172, the reference time generator 164, the renderer 178 of any of FIGS. 1-9, or a combination of one or more components thereof.

The method 1700 includes, at block 1702, obtaining, at a first audio output device of a personal audio apparatus, first spatial audio data and a first reference time associated with the first spatial audio data. For example, the first audio output device 110 of FIGS. 1-15 may obtain the first spatial audio data via the wireless transmissions 106 from the host device 102. In this example, the reference time generator 124 of FIG. 1 may generate the first reference time 128 associated with the first spatial audio data.

The method 1700 includes, at block 1704, causing the first reference time and data representing at least a portion of the first spatial audio data to be transmitted from the first audio output device. For example, the first audio output device 110 may transmit the data 133 and the first reference time 128 to the second audio output device 150. In some implementation, the data 133 includes the first spatial audio data.

The method 1700 includes, at block 1706, decoding the first spatial audio data to generate decoded first spatial audio data. For example, the codec 122 may decode one or more data frames of the first data steam 103A to generate the decoded first spatial audio data 126.

The method 1700 includes, at block 1708, storing the decoded first spatial audio data at a first buffer and storing the combined audio data at a second buffer until a playback time. For example, the decoded first spatial audio data 126 and the combined audio data 142 may each be stored at one or more of the buffer(s) 140.

The method 1700 includes, at block 1710, receiving, at the first audio output device from a second audio output device of the personal audio apparatus, second spatial audio data and a second reference time associated with the second spatial audio data. For example, the first audio output device 110 may receive, from the second audio output device 150, the second spatial audio data 173 and the second reference time 168.

The method 1700 includes, at block 1712, based on the first reference time and the second reference time, time-aligning the first spatial audio data and the second spatial audio data to generate combined audio data representing a three-dimensional (3D) sound field. For example, the processor(s) 112 or the renderer 138 may time-align a data frame of the first spatial audio data with a corresponding data frame of the second spatial audio data to generate a data frame of the combines audio data 142.

The method 1700 includes, at block 1714, modifying the combined audio data based on motion data to generate modified combined audio data representing a rotated version of the 3D sound field, wherein the audio output is based on the modified combined audio data. For example, the combined audio data 142 may be modified based on motion data from the motion sensor(s) 148.

The method 1700 includes, at block 1716, generating audio output based on the combined audio data. For example, the renderer 138 may send audio data based on a data frame of the combined audio data 142 to the loudspeaker(s) 144 for output at a time-to-play associated with the data frame.

The method 1700 includes, at block 1718, producing, at one or more loudspeakers coupled to or integrated within the first audio output device, sound based on the audio output. For example, the loudspeaker(s) 144 may produce the first sound output 146 based on the audio data from the renderer 138.

The method 1700 of FIG. 17 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1700 of FIG. 17 may be performed by a processor that executes instructions, such as the processor(s) 112 executing the instructions 116 of FIG. 1.

Although the method 1700 of FIG. 17 is described generally from the perspective of the first audio output device 110, the second audio output device 150 may perform the operations of the method 1700 in addition to, or instead of, the first audio output device 110.

In conjunction with the described implementations, an apparatus includes means for obtaining first spatial audio data and a first reference time associated with the first spatial audio data at a first audio output device of a personal audio apparatus. For example, the means for obtaining first spatial audio data and the first reference time can correspond to the first audio output device 110, the processor(s) 112, the receiver 118, the reference time generator 124, one or more other circuits or components configured to obtain spatial audio data and a reference time, or any combination thereof.

The apparatus also includes means for causing the first reference time and data representing at least a portion of the first spatial audio data to be transmitted from the first audio output device. For example, the means for means for causing the first reference time and data representing at least a portion of the first spatial audio data to be transmitted from the first audio output device can correspond to the first audio output device 110, the processor(s) 112, the transceiver 132, one or more other circuits or components configured to perform data exchange, or any combination thereof.

The apparatus further includes means for receiving second spatial audio data and a second reference time associated with the second spatial audio data at the first audio output device from a second audio output device of the personal audio apparatus. For example, the means for receiving second spatial audio data and a second reference time associated with the second spatial audio data can correspond to the first audio output device 110, the processor(s) 112, the transceiver 132, one or more other circuits or components configured to receive data, or any combination thereof.

The apparatus further includes means for time-aligning the first spatial audio data and the second spatial audio data based on the first reference time and the second reference time to generate combined audio data representing a three-dimensional (3D) sound field. For example, the means for time-aligning the first spatial audio data and the second spatial audio data can correspond to the first audio output device 110, the processor(s) 112, the renderer 138, one or more other circuits or components configured to time-align audio data, or any combination thereof.

The apparatus further includes means for generating audio output based on the combined audio data. For example, the generating audio output can correspond to the first audio output device 110, the processor(s) 112, the loudspeaker(s) 144, one or more other circuits or components configured to generate audio output, or any combination thereof.

In some implementations, a non-transitory computer-readable medium (e.g., a computer-readable storage device, such as the memory 114) includes instructions (e.g., the instructions 116) that, when executed by one or more processors (e.g., the processor(s) 112), cause the one or more processors to obtain first spatial audio data and a first reference time associated with the first spatial audio data at a first audio output device (e.g., the first audio output device 110). The instructions, when executed by the one or more processors, also cause the one or more processors to cause the first reference time and data representing at least a portion of the first spatial audio data to be transmitted from the first audio output device. The instructions, when executed by the one or more processors, further cause the one or more processors to receive, at the first audio output device from a second audio output device of the personal audio apparatus, second spatial audio data and a second reference time associated with the second spatial audio data. The instructions, when executed by the one or more processors, also cause the one or more processors to, based on the first reference time and the second reference time, time-align the first spatial audio data and the second spatial audio data to generate combined audio data representing a 3D sound field. The instructions, when executed by the one or more processors, also cause the one or more processors to generate audio output based on the combined audio data.

Particular aspects of the disclosure are described below in sets of interrelated clauses:

Clause 1 includes a device including: a memory configured to store instructions; and one or more processors configured to execute the instructions to: obtain, at a first audio output device of a personal audio apparatus, first spatial audio data and a first reference time associated with the first spatial audio data; cause the first reference time and data representing at least a portion of the first spatial audio data to be transmitted from the first audio output device; receive, at the first audio output device from a second audio output device of the personal audio apparatus, second spatial audio data and a second reference time associated with the second spatial audio data; based on the first reference time and the second reference time, time-align the first spatial audio data and the second spatial audio data to generate combined audio data representing a three-dimensional (3D) sound field; and generate audio output based on the combined audio data.

Clause 2 includes the device of Clause 1, further including a receiver coupled to the one or more processors and configured to receive a data stream including the first spatial audio data at the first audio output device from a host device via a wireless peer-to-peer ad-hoc link.

Clause 3 includes the device of Clause 1 or Clause 2, further including a transceiver coupled to the one or more processors, the transceiver configured to transmit the first reference time and the data representing at least the portion of the first spatial audio data from the first audio output device via a wireless link to the second audio output device.

Clause 4 includes the device of Clause 3, wherein the transceiver is further configured to receive the second spatial audio data and the second reference time at the first audio output device via the wireless link from the second audio output device.

Clause 5 includes the device of Clause 3 or Clause 4, further including a local clock of the first audio output device, wherein the transceiver is further configured to transmit a clock signal based on the local clock to the second audio output device via the wireless link.

Clause 6 includes the device of any of Clauses 3 to 5, wherein the transceiver is further configured to receive a clock signal at the first audio output device via the wireless link from the second audio output device.

Clause 7 includes the device of any of Clauses 1 to 6, further including: a modem coupled to the one or more processors and configured to obtain the first spatial audio data at the first audio output device via a wireless transmission; and a codec coupled to the modem and configured to decode the first spatial audio data to generate decoded first spatial audio data, wherein the data representing at least the portion of the first spatial audio data is based on the decoded first spatial audio data.

Clause 8 includes the device of Clause 7, wherein the codec includes a stereo decoder, and wherein the first spatial audio data is encoded as stereo data representing a pair of data channels.

Clause 9 includes the device of Clause 7 or Clause 8, wherein the decoded first spatial audio data includes ambisonics coefficients.

Clause 10 includes the device of Clause 7 or Clause 8, wherein the decoded first spatial audio data includes pulse-code modulation (PCM) data.

Clause 11 includes the device of Clause 7 or Clause 8, wherein the decoded first spatial audio data represents two channels of an equivalent spatial domain (ESD) representation of the 3D sound field.

Clause 12 includes the device of any of Clauses 7 to 11, further including a first buffer configured to store the decoded first spatial audio data and a second buffer configured to store the combined audio data until a playback time.

Clause 13 includes the device of any of Clauses 1 to 12, wherein the second spatial audio data includes ambisonics coefficients.

Clause 14 includes the device of any of Clauses 1 to 12, wherein the second spatial audio data includes pulse-code modulation (PCM) data.

Clause 15 includes the device of any of Clauses 1 to 12, wherein the second spatial audio data represents two channels of an equivalent spatial domain (ESD) representation of the 3D sound field.

Clause 16 includes the device of any of Clauses 1 to 15, wherein the first audio output device corresponds to a first ear bud, a first speaker, or a first ear cup of a headset, and wherein the second audio output device corresponds to a second earbud, a second speaker, or a second earcup of the headset.

Clause 17 includes the device of any of Clauses 1 to 16, further including one or more loudspeakers coupled to or integrated within the first audio output device, the one or more loudspeakers configured to produce sound based on the audio output.

Clause 18 includes the device of any of Clauses 1 to 17, wherein the combined audio data include first-order ambisonics coefficients.

Clause 19 includes the device of any of Clauses 1 to 17, wherein the combined audio data include higher-order ambisonics coefficients.

Clause 20 includes the device of any of Clauses 1 to 17, wherein the combined audio data include pulse-code modulation (PCM) data.

Clause 21 includes the device of any of Clauses 1 to 17, wherein the combined audio data represent four or more channels of an equivalent spatial domain (ESD) representation of the 3D sound field.

Clause 22 includes the device of any of Clauses 1 to 21, further including one or more motion sensors coupled to the one or more processors and configured to generate motion data, wherein the one or more processors are further configured to modify the combined audio data based on the motion data to generate modified combined audio data representing a rotated version of the 3D sound field, wherein the audio output is based on the modified combined audio data.

Clause 23 includes the device of Clause 22, wherein the motion data represents head motion and wherein the one or more processors are further configured to cause the motion data to be transmitted from the first audio output device to the second audio output device.

Clause 24 includes the device of any of Clauses 1 to 23, wherein the first spatial audio data represents a first set of ambisonics coefficients and the second spatial audio data represents a second set of ambisonics coefficients, and wherein the first set of ambisonics coefficients and the second set of ambisonics coefficients together represent the 3D sound field.

Clause 25 includes the device of Clause 24, wherein the first set of ambisonics coefficients correspond to two channels of four channels of a first-order ambisonics representation of the 3D sound field, and the second set of ambisonics coefficients correspond to the other two channels of the four channels of the first-order ambisonics representation of the 3D sound field.

Clause 26 includes the device of Clause 24, wherein the first set of ambisonics coefficients correspond to four or more channels of eight or more channels of a higher-order ambisonics representation of the 3D sound field, and the second set of ambisonics coefficients correspond to the remaining channels of the eight or more channels of the higher-order ambisonics representation of the 3D sound field.

Clause 27 includes the device of any of Clauses 1 to 26, wherein the first spatial audio data and the second spatial audio data are time aligned sequentially to generate the combined audio data.

Clause 28 includes a method including: obtaining, at a first audio output device of a personal audio apparatus, first spatial audio data and a first reference time associated with the first spatial audio data; causing the first reference time and data representing at least a portion of the first spatial audio data to be transmitted from the first audio output device; receiving, at the first audio output device from a second audio output device of the personal audio apparatus, second spatial audio data and a second reference time associated with the second spatial audio data; based on the first reference time and the second reference time, time-aligning the first spatial audio data and the second spatial audio data to generate combined audio data representing a three-dimensional (3D) sound field; and generating audio output based on the combined audio data.

Clause 29 includes the method of Clause 28, wherein obtaining the first spatial audio data includes receiving the first spatial audio data at the first audio output device from a host device via a wireless peer-to-peer ad-hoc link.

Clause 30 includes the method of Clause 28 or Clause 29, wherein the first reference time and the data representing at least the portion of the first spatial audio data are transmitted from the first audio output device via a wireless link to the second audio output device.

Clause 31 includes the method of any of Clauses 28 to 30, wherein the second spatial audio data and the second reference time are received at the first audio output device via a wireless link from the second audio output device.

Clause 32 includes the method of any of Clauses 28 to 31, further including transmitting a clock signal based on a local clock to the second audio output device via a wireless link.

Clause 33 includes the method of any of Clauses 28 to 32, further including receiving a clock signal at the first audio output device via a wireless link from the second audio output device.

Clause 34 includes the method of any of Clauses 28 to 33, further including decoding the first spatial audio data to generate decoded first spatial audio data, wherein the data representing at least the portion of the first spatial audio data is based on the decoded first spatial audio data.

Clause 35 includes the method of Clause 34, wherein the first spatial audio data is encoded as stereo data representing a pair of data channels.

Clause 36 includes the method of Clause 34, wherein the decoded first spatial audio data includes ambisonics coefficients.

Clause 37 includes the method of Clause 34, wherein the decoded first spatial audio data includes pulse-code modulation (PCM) data.

Clause 38 includes the method of Clause 34, wherein the decoded first spatial audio data represents two channels of an equivalent spatial domain (ESD) representation of the 3D sound field.

Clause 39 includes the method of any of Clauses 34 to 38, further including storing the decoded first spatial audio data at a first buffer and storing the combined audio data at a second buffer until a playback time.

Clause 40 includes the method of any of Clauses 28 to 39, wherein the second spatial audio data includes ambisonics coefficients.

Clause 41 includes the method of any of Clauses 28 to 39, wherein the second spatial audio data includes pulse-code modulation (PCM) data.

Clause 42 includes the method of any of Clauses 28 to 39, wherein the second spatial audio data represents two channels of an equivalent spatial domain (ESD) representation of the 3D sound field.

Clause 43 includes the method of any of Clauses 28 to 42, wherein the first audio output device corresponds to a first ear bud, a first speaker, or a first ear cup of a headset, and wherein the second audio output device corresponds to a second earbud, a second speaker, or a second earcup of the headset.

Clause 44 includes the method of any of Clauses 28 to 43, further including producing, at one or more loudspeakers coupled to or integrated within the first audio output device, sound based on the audio output.

Clause 45 includes the method of any of Clauses 28 to 44, wherein the combined audio data include first-order ambisonics coefficients.

Clause 46 includes the method of any of Clauses 28 to 44, wherein the combined audio data include higher-order ambisonics coefficients.

Clause 47 includes the method of any of Clauses 28 to 44, wherein the combined audio data include pulse-code modulation (PCM) data.

Clause 48 includes the method of any of Clauses 28 to 44, wherein the combined audio data represent four or more channels of an equivalent spatial domain (ESD) representation of the 3D sound field.

Clause 49 includes the method of any of Clauses 28 to 48, further including modifying the combined audio data based on motion data to generate modified combined audio data representing a rotated version of the 3D sound field, wherein the audio output is based on the modified combined audio data.

Clause 50 includes the method of Clause 49, wherein the motion data represents head motion and further including causing the motion data to be transmitted from the first audio output device to the second audio output device.

Clause 51 includes the method of any of Clauses 28 to 50, wherein the first spatial audio data represents a first set of ambisonics coefficients and the second spatial audio data represents a second set of ambisonics coefficients, and wherein the first set of ambisonics coefficients and the second set of ambisonics coefficients together represent the 3D sound field.

Clause 52 includes the method of Clause 51, wherein the first set of ambisonics coefficients correspond to two channels of four channels of a first-order ambisonics representation of the 3D sound field, and the second set of ambisonics coefficients correspond to the other two channels of the four channels of the first-order ambisonics representation of the 3D sound field.

Clause 53 includes the method of Clause 51, wherein the first set of ambisonics coefficients correspond to four or more channels of eight or more channels of a higher-order ambisonics representation of the 3D sound field, and the second set of ambisonics coefficients correspond to the remaining channels of the eight or more channels of the higher-order ambisonics representation of the 3D sound field.

Clause 54 includes the method of any of Clauses 28 to 53, wherein the first spatial audio data and the second spatial audio data are time aligned sequentially to generate the combined audio data.

Clause 55 includes an apparatus including: means for obtaining first spatial audio data and a first reference time associated with the first spatial audio data at a first audio output device of a personal audio apparatus; means for causing the first reference time and data representing at least a portion of the first spatial audio data to be transmitted from the first audio output device; means for receiving second spatial audio data and a second reference time associated with the second spatial audio data at the first audio output device from a second audio output device of the personal audio apparatus; means for time-aligning the first spatial audio data and the second spatial audio data based on the first reference time and the second reference time to generate combined audio data representing a three-dimensional (3D) sound field; and means for generating audio output based on the combined audio data.

Clause 56 includes the apparatus of Clause 55, wherein obtaining the first spatial audio data includes receiving the first spatial audio data at the first audio output device from a host device via a wireless peer-to-peer ad-hoc link.

Clause 57 includes the apparatus of Clause 55 or Clause 56, wherein the first reference time and the data representing at least the portion of the first spatial audio data are transmitted from the first audio output device via a wireless link to the second audio output device.

Clause 58 includes the apparatus of any of Clauses 55 to 57, wherein the second spatial audio data and the second reference time are received at the first audio output device via a wireless link from the second audio output device.

Clause 59 includes the apparatus of any of Clauses 55 to 58, further including means for transmitting a clock signal based on a local clock to the second audio output device via a wireless link.

Clause 60 includes the apparatus of any of Clauses 55 to 59, further including means for receiving a clock signal at the first audio output device via a wireless link from the second audio output device.

Clause 61 includes the apparatus of any of Clauses 55 to 60, further including means for decoding the first spatial audio data to generate decoded first spatial audio data, wherein the data representing at least the portion of the first spatial audio data is based on the decoded first spatial audio data.

Clause 62 includes the apparatus of Clause 61, wherein the first spatial audio data is encoded as stereo data representing a pair of data channels.

Clause 63 includes the apparatus of Clause 61, wherein the decoded first spatial audio data includes ambisonics coefficients.

Clause 64 includes the apparatus of Clause 61, wherein the decoded first spatial audio data includes pulse-code modulation (PCM) data.

Clause 65 includes the apparatus of Clause 61, wherein the decoded first spatial audio data represents two channels of an equivalent spatial domain (ESD) representation of the 3D sound field.

Clause 66 includes the apparatus of any of Clauses 61 to 65, further including means for storing the decoded first spatial audio data at a first buffer and means for storing the combined audio data at a second buffer until a playback time.

Clause 67 includes the apparatus of any of Clauses 55 to 66, wherein the second spatial audio data includes ambisonics coefficients.

Clause 68 includes the apparatus of any of Clauses 55 to 66, wherein the second spatial audio data includes pulse-code modulation (PCM) data.

Clause 69 includes the apparatus of any of Clauses 55 to 66, wherein the second spatial audio data represents two channels of an equivalent spatial domain (ESD) representation of the 3D sound field.

Clause 70 includes the apparatus of any of Clauses 55 to 69, wherein the first audio output device corresponds to a first ear bud, a first speaker, or a first ear cup of a headset, and wherein the second audio output device corresponds to a second earbud, a second speaker, or a second earcup of the headset.

Clause 71 includes the apparatus of any of Clauses 55 to 70, further including means for producing sound based on the audio output.

Clause 72 includes the apparatus of any of Clauses 55 to 71, wherein the combined audio data include first-order ambisonics coefficients.

Clause 73 includes the apparatus of any of Clauses 55 to 71, wherein the combined audio data include higher-order ambisonics coefficients.

Clause 74 includes the apparatus of any of Clauses 55 to 71, wherein the combined audio data include pulse-code modulation (PCM) data.

Clause 75 includes the apparatus of any of Clauses 55 to 71, wherein the combined audio data represent four or more channels of an equivalent spatial domain (ESD) representation of the 3D sound field.

Clause 76 includes the apparatus of any of Clauses 55 to 75, further including means for modifying the combined audio data based on motion data to generate modified combined audio data representing a rotated version of the 3D sound field, wherein the audio output is based on the modified combined audio data.

Clause 77 includes the apparatus of Clause 76, wherein the motion data represents head motion and further including means for causing the motion data to be transmitted from the first audio output device to the second audio output device.

Clause 78 includes the apparatus of any of Clauses 55 to 77, wherein the first spatial audio data represents a first set of ambisonics coefficients and the second spatial audio data represents a second set of ambisonics coefficients, and wherein the first set of ambisonics coefficients and the second set of ambisonics coefficients together represent the 3D sound field.

Clause 79 includes the apparatus of Clause 78, wherein the first set of ambisonics coefficients correspond to two channels of four channels of a first-order ambisonics representation of the 3D sound field, and the second set of ambisonics coefficients correspond to the other two channels of the four channels of the first-order ambisonics representation of the 3D sound field.

Clause 80 includes the apparatus of Clause 78, wherein the first set of ambisonics coefficients correspond to four or more channels of eight or more channels of a higher-order ambisonics representation of the 3D sound field, and the second set of ambisonics coefficients correspond to the remaining channels of the eight or more channels of the higher-order ambisonics representation of the 3D sound field.

Clause 81 includes the apparatus of any of Clauses 55 to 80, wherein the first spatial audio data and the second spatial audio data are time aligned sequentially to generate the combined audio data.

Clause 82 includes a non-transitory computer-readable storage device storing instructions that are executable by one or more processors to cause the one or more processors to: obtain, at a first audio output device of a personal audio apparatus, first spatial audio data and a first reference time associated with the first spatial audio data; cause the first reference time and data representing at least a portion of the first spatial audio data to be transmitted from the first audio output device; receive, at the first audio output device from a second audio output device of the personal audio apparatus, second spatial audio data and a second reference time associated with the second spatial audio data; based on the first reference time and the second reference time, time-align the first spatial audio data and the second spatial audio data to generate combined audio data representing a three-dimensional (3D) sound field; and generate audio output based on the combined audio data.

Clause 83 includes the non-transitory computer-readable storage device of Clause 82, wherein obtaining the first spatial audio data includes receiving the first spatial audio data at the first audio output device from a host device via a wireless peer-to-peer ad-hoc link.

Clause 84 includes the non-transitory computer-readable storage device of Clause 82 or Clause 83, wherein the first reference time and the data representing at least the portion of the first spatial audio data are transmitted from the first audio output device via a wireless link to the second audio output device.

Clause 85 includes the non-transitory computer-readable storage device of any of Clauses 82 to 84, wherein the second spatial audio data and the second reference time are received at the first audio output device via a wireless link from the second audio output device.

Clause 86 includes the non-transitory computer-readable storage device of any of Clauses 82 to 85, further including transmitting a clock signal based on a local clock to the second audio output device via a wireless link.

Clause 87 includes the non-transitory computer-readable storage device of any of Clauses 82 to 86, wherein the instructions are further executable to cause the one or more processors to receive a clock signal at the first audio output device via a wireless link from the second audio output device.

Clause 88 includes the non-transitory computer-readable storage device of any of Clauses 82 to 87, wherein the instructions are further executable to cause the one or more processors to decode the first spatial audio data to generate decoded first spatial audio data, wherein the data representing at least the portion of the first spatial audio data is based on the decoded first spatial audio data.

Clause 89 includes the non-transitory computer-readable storage device of Clause 88, wherein the first spatial audio data is encoded as stereo data representing a pair of data channels.

Clause 90 includes the non-transitory computer-readable storage device of Clause 88 or Clause 89, wherein the decoded first spatial audio data includes ambisonics coefficients.

Clause 91 includes the non-transitory computer-readable storage device of Clause 88 or Clause 89, wherein the decoded first spatial audio data includes pulse-code modulation (PCM) data.

Clause 92 includes the non-transitory computer-readable storage device of Clause 88 or Clause 89, wherein the decoded first spatial audio data represents two channels of an equivalent spatial domain (ESD) representation of the 3D sound field.

Clause 93 includes the non-transitory computer-readable storage device of any of Clauses 88 to 92, wherein the instructions are further executable to cause the one or more processors to store the decoded first spatial audio data at a first buffer and store the combined audio data at a second buffer until a playback time.

Clause 94 includes the non-transitory computer-readable storage device of any of Clauses 82 to 93, wherein the second spatial audio data includes ambisonics coefficients.

Clause 95 includes the non-transitory computer-readable storage device of any of Clauses 82 to 93, wherein the second spatial audio data includes pulse-code modulation (PCM) data.

Clause 96 includes the non-transitory computer-readable storage device of any of Clauses 82 to 93, wherein the second spatial audio data represents two channels of an equivalent spatial domain (ESD) representation of the 3D sound field.

Clause 97 includes the non-transitory computer-readable storage device of any of Clauses 82 to 96, wherein the first audio output device corresponds to a first ear bud, a first speaker, or a first ear cup of a headset, and wherein the second audio output device corresponds to a second earbud, a second speaker, or a second earcup of the headset.

Clause 98 includes the non-transitory computer-readable storage device of any of Clauses 82 to 98, wherein the instructions are further executable to cause the one or more processors to cause one or more loudspeakers coupled to or integrated within the first audio output device to produce sound based on the audio output.

Clause 99 includes the non-transitory computer-readable storage device of any of Clauses 82 to 98, wherein the combined audio data include first-order ambisonics coefficients.

Clause 100 includes the non-transitory computer-readable storage device of any of Clauses 82 to 98, wherein the combined audio data include higher-order ambisonics coefficients.

Clause 101 includes the non-transitory computer-readable storage device of any of Clauses 82 to 98, wherein the combined audio data include pulse-code modulation (PCM) data.

Clause 102 includes the non-transitory computer-readable storage device of any of Clauses 82 to 98, wherein the combined audio data represent four or more channels of an equivalent spatial domain (ESD) representation of the 3D sound field.

Clause 103 includes the non-transitory computer-readable storage device of any of Clauses 82 to 102, wherein the instructions are further executable to cause the one or more processors to modify the combined audio data based on motion data to generate modified combined audio data representing a rotated version of the 3D sound field, wherein the audio output is based on the modified combined audio data.

Clause 104 includes the non-transitory computer-readable storage device of Clause 103, wherein the motion data represents head motion and wherein the instructions are further executable to cause the one or more processors to cause the motion data to be transmitted from the first audio output device to the second audio output device.

Clause 105 includes the non-transitory computer-readable storage device of any of Clauses 82 to 104, wherein the first spatial audio data represents a first set of ambisonics coefficients and the second spatial audio data represents a second set of ambisonics coefficients, and wherein the first set of ambisonics coefficients and the second set of ambisonics coefficients together represent the 3D sound field.

Clause 106 includes the non-transitory computer-readable storage device of Clause 105, wherein the first set of ambisonics coefficients correspond to two channels of four channels of a first-order ambisonics representation of the 3D sound field, and the second set of ambisonics coefficients correspond to the other two channels of the four channels of the first-order ambisonics representation of the 3D sound field.

Clause 107 includes the non-transitory computer-readable storage device of Clause 105, wherein the first set of ambisonics coefficients correspond to four or more channels of eight or more channels of a higher-order ambisonics representation of the 3D sound field, and the second set of ambisonics coefficients correspond to the remaining channels of the eight or more channels of the higher-order ambisonics representation of the 3D sound field.

Clause 108 includes the non-transitory computer-readable storage device of any of Clauses 82 to 107, wherein the first spatial audio data and the second spatial audio data are time aligned sequentially to generate the combined audio data.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store instructions; and
one or more processors configured to execute the instructions to:
obtain, at a first audio output device of a personal audio apparatus, first spatial audio data and a first reference time associated with the first spatial audio data;
cause the first reference time and data representing at least a portion of the first spatial audio data to be transmitted from the first audio output device;
receive, at the first audio output device from a second audio output device of the personal audio apparatus, second spatial audio data and a second reference time associated with the second spatial audio data;
based on the first reference time and the second reference time, time-align the first spatial audio data and the second spatial audio data to generate combined audio data representing a three-dimensional (3D) sound field; and
generate audio output based on the combined audio data.

2. The device of claim 1, further comprising a receiver coupled to the one or more processors and configured to receive the first spatial audio data at the first audio output device from a host device via a wireless peer-to-peer ad-hoc link.

3. The device of claim 1, further comprising a transceiver coupled to the one or more processors, the transceiver configured to transmit the first reference time and the data representing at least the portion of the first spatial audio data from the first audio output device via a wireless link to the second audio output device.

4. The device of claim 3, wherein the transceiver is further configured to receive the second spatial audio data and the second reference time at the first audio output device via the wireless link from the second audio output device.

5. The device of claim 3, further comprising a local clock of the first audio output device, wherein the transceiver is further configured to transmit a clock signal based on the local clock to the second audio output device via the wireless link.

6. The device of claim 3, wherein the transceiver is further configured to receive a clock signal at the first audio output device via the wireless link from the second audio output device.

7. The device of claim 1, further comprising:
a modem coupled to the one or more processors and configured to obtain the first spatial audio data at the first audio output device via a wireless transmission; and
a codec coupled to the modem and configured to decode the first spatial audio data to generate decoded first spatial audio data, wherein the data representing at least the portion of the first spatial audio data is based on the decoded first spatial audio data.

8. The device of claim 7, further comprising a first buffer configured to store the decoded first spatial audio data and a second buffer configured to store the combined audio data until a playback time.

9. The device of claim 1, wherein the one or more processors are integrated in one or more ear buds, a headset device, a virtual reality headset, a mixed reality headset, an extended reality headset, or an augmented reality headset.

10. The device of claim 1, wherein the second spatial audio data includes one of: ambisonics coefficients, pulse-code modulation (PCM) data, or at least two channels of an equivalent spatial domain (ESD) representation of the 3D sound field.

11. The device of claim 1, wherein the personal audio apparatus includes the first audio output device and the second audio output device, wherein the first audio output device corresponds to a first ear bud, a first speaker, or a first ear cup of a headset, and wherein the second audio output device corresponds to a second earbud, a second speaker, or a second ear cup of the headset.

12. The device of claim 1, further comprising one or more loudspeakers coupled to or integrated within the first audio output device, the one or more loudspeakers configured to produce sound based on the audio output.

13. The device of claim 1, further comprising one or more motion sensors coupled to the one or more processors and configured to generate motion data, wherein the one or more processors are further configured to modify the combined audio data based on the motion data to generate modified combined audio data representing a rotated version of the 3D sound field, wherein the audio output is based on the modified combined audio data.

14. The device of claim 13, wherein the motion data represents head motion and wherein the one or more processors are further configured to cause the motion data to be transmitted from the first audio output device to the second audio output device.

15. A method comprising:
obtaining, at a first audio output device of a personal audio apparatus, first spatial audio data and a first reference time associated with the first spatial audio data;
causing the first reference time and data representing at least a portion of the first spatial audio data to be transmitted from the first audio output device;
receiving, at the first audio output device from a second audio output device of the personal audio apparatus, second spatial audio data and a second reference time associated with the second spatial audio data;
based on the first reference time and the second reference time, time-aligning the first spatial audio data and the second spatial audio data to generate combined audio data representing a three-dimensional (3D) sound field; and
generating audio output based on the combined audio data.

16. The method of claim 15, wherein the first reference time and the data representing at least the portion of the first spatial audio data are transmitted from the first audio output device via a wireless link to the second audio output device, and wherein the second spatial audio data and the second reference time are received at the first audio output device via the wireless link from the second audio output device.

17. The method of claim 15, further comprising decoding the first spatial audio data to generate decoded first spatial audio data, wherein the data representing at least the portion of the first spatial audio data is based on the decoded first spatial audio data.

18. The method of claim 17, wherein the decoded first spatial audio data includes one of: ambisonics coefficients, pulse-code modulation (PCM) data, or at least two channels of an equivalent spatial domain (ESD) representation of the 3D sound field.

19. The method of claim 17, further comprising storing the decoded first spatial audio data at a first buffer and storing the combined audio data at a second buffer until a playback time.

20. The method of claim 15, wherein the second spatial audio data includes one of: ambisonics coefficients, pulse-code modulation (PCM) data, or at least two channels of an equivalent spatial domain (ESD) representation of the 3D sound field.

21. The method of claim 15, further comprising producing, at one or more loudspeakers coupled to or integrated within the first audio output device, sound based on the audio output.

22. The method of claim 15, wherein the combined audio data includes one of: first-order ambisonics coefficients, higher-order ambisonics coefficients, pulse-code modulation (PCM) data, or four or more channels of an equivalent spatial domain (ESD) representation of the 3D sound field.

23. The method of claim 15, further comprising modifying the combined audio data based on motion data to generate modified combined audio data representing a rotated version of the 3D sound field, wherein the audio output is based on the modified combined audio data.

24. The method of claim 23, wherein the motion data represents head motion and further comprising causing the motion data to be transmitted from the first audio output device to the second audio output device.

25. The method of claim 15, wherein the first spatial audio data represents a first set of ambisonics coefficients and the second spatial audio data represents a second set of ambisonics coefficients, and wherein the first set of ambisonics coefficients and the second set of ambisonics coefficients together represent the 3D sound field.

26. An apparatus comprising:
means for obtaining first spatial audio data and a first reference time associated with the first spatial audio data at a first audio output device of a personal audio apparatus;
means for causing the first reference time and data representing at least a portion of the first spatial audio data to be transmitted from the first audio output device;
means for receiving second spatial audio data and a second reference time associated with the second spatial audio data at the first audio output device from a second audio output device of the personal audio apparatus;
means for time-aligning the first spatial audio data and the second spatial audio data based on the first reference time and the second reference time to generate combined audio data representing a three-dimensional (3D) sound field; and
means for generating audio output based on the combined audio data.

27. The apparatus of claim 26, further comprising means for producing sound based on the audio output.

28. A non-transitory computer-readable storage device storing instructions that are executable by one or more processors to cause the one or more processors to:
obtain, at a first audio output device of a personal audio apparatus, first spatial audio data and a first reference time associated with the first spatial audio data;
cause the first reference time and data representing at least a portion of the first spatial audio data to be transmitted from the first audio output device;
receive, at the first audio output device from a second audio output device of the personal audio apparatus, second spatial audio data and a second reference time associated with the second spatial audio data;
based on the first reference time and the second reference time, time-align the first spatial audio data and the second spatial audio data to generate combined audio data representing a three-dimensional (3D) sound field; and
generate audio output based on the combined audio data.

29. The non-transitory computer-readable storage device of claim 28, wherein the instructions are further executable to cause the one or more processors to decode the first spatial audio data to generate decoded first spatial audio data, wherein the data representing at least the portion of the first spatial audio data is based on the decoded first spatial audio data.

30. The non-transitory computer-readable storage device of claim 29, wherein the instructions are further executable to cause the one or more processors to:
store the decoded first spatial audio data at a first buffer;
store the combined audio data at a second buffer until a playback time; and
cause one or more loudspeakers coupled to or integrated within the first audio output device to produce sound based on the audio output at the playback time.

* * * * *